US008655496B1

(12) United States Patent
Stewart

(10) Patent No.: US 8,655,496 B1
(45) Date of Patent: Feb. 18, 2014

(54) NETWORKED ENERGY MANAGEMENT

(71) Applicant: Douglas Ian Stewart, Healdsburg, CA (US)

(72) Inventor: Douglas Ian Stewart, Healdsburg, CA (US)

(*) Notice: Subject to any disclaimer, the term of this patent is extended or adjusted under 35 U.S.C. 154(b) by 0 days.

(21) Appl. No.: 13/800,673

(22) Filed: Mar. 13, 2013

(51) Int. Cl.
G05B 11/12 (2006.01)

(52) U.S. Cl.
USPC .......................................... 700/287; 700/286

(58) Field of Classification Search
None
See application file for complete search history.

(56) References Cited

U.S. PATENT DOCUMENTS

| 3,166,738 | A | * | 1/1965 | Slade | 365/160 |
| 3,479,569 | A | * | 11/1969 | Sole et al. | 361/141 |
| 3,521,699 | A | * | 7/1970 | Van Huisen | 165/45 |
| 4,426,846 | A | * | 1/1984 | Bailey | 60/398 |
| 6,021,402 | A | | 2/2000 | Takriti | |
| 6,252,753 | B1 | * | 6/2001 | Bhargava | 361/62 |
| 6,354,087 | B1 | | 3/2002 | Nakahara et al. | |
| 6,420,794 | B1 | * | 7/2002 | Cao | 290/43 |
| 7,602,085 | B2 | | 10/2009 | Kawamura et al. | |
| 8,131,401 | B2 | | 3/2012 | Nasle | |
| 8,229,722 | B2 | | 7/2012 | Nasle | |
| 2004/0199478 | A1 | * | 10/2004 | Arita et al. | 705/412 |
| 2005/0125104 | A1 | * | 6/2005 | Wilson et al. | 700/295 |
| 2005/0154499 | A1 | | 7/2005 | Aldridge et al. | |
| 2007/0005192 | A1 | * | 1/2007 | Schoettle et al. | 700/286 |
| 2007/0107443 | A1 | * | 5/2007 | Royal et al. | 62/48.2 |
| 2008/0283110 | A1 | * | 11/2008 | Jin et al. | 136/206 |
| 2008/0319893 | A1 | | 12/2008 | Mashinsky et al. | |
| 2009/0177548 | A1 | * | 7/2009 | Eisenlohr | 705/14 |
| 2010/0100250 | A1 | * | 4/2010 | Budhraja et al. | 700/291 |
| 2010/0144537 | A1 | * | 6/2010 | Kawashima | 505/211 |
| 2010/0262308 | A1 | * | 10/2010 | Anderson et al. | 700/287 |
| 2010/0314942 | A1 | * | 12/2010 | Talkin et al. | 307/41 |
| 2011/0156494 | A1 | * | 6/2011 | Mashinsky | 307/104 |
| 2012/0033462 | A1 | * | 2/2012 | Juhlin | 363/35 |
| 2012/0065802 | A1 | | 3/2012 | Seeber et al. | |
| 2012/0142537 | A1 | | 6/2012 | Carter et al. | |
| 2012/0143385 | A1 | * | 6/2012 | Goldsmith | 700/297 |
| 2012/0179301 | A1 | | 7/2012 | Aivaliotis et al. | |

FOREIGN PATENT DOCUMENTS

| CN | 102355057 | 2/2012 |
| RU | 2354023 | 4/2009 |
| WO | WO 2005/121652 | 12/2005 |

* cited by examiner

Primary Examiner — Kavita Padmanabhan
Assistant Examiner — Patrick Cummins
(74) Attorney, Agent, or Firm — Knobbe, Martens, Olson & Bear LLP

(57) ABSTRACT

A network-based energy management system may identify an area that exhibits a need for electrical energy. The network-based energy management system may also identify an area that exhibits an ability to provide electrical energy. The network-based energy management system may cause electrical energy to be routed from the second area to the first area. In some embodiments, the first area and the second area may include base stations that are electrically connected to one another by one or more energy conduits, which may include superconducting wires so as to minimize transmission losses between base stations and their respective areas.

20 Claims, 14 Drawing Sheets

NETWORKED ENERGY MANAGEMENT

BACKGROUND

Demand for energy fluctuates from peak to trough and back over days and over seasons. Energy demand is typically higher during the day than at night, as electricity is needed to power computers, manufacturing equipment, etc. during the work day. For example, in Asia, energy demand is relatively high during the day and relatively low during the night. Likewise, in North America, energy demand is relatively high during the day and relatively low during the night. However, when it is night-time in Asia, it is daytime in the Western Hemisphere. The energy demand level in North America may be high during the daytime while the energy demand level in Asia is low during the Asian night-time. Energy demand is also typically higher or lower on a yearly cycle based on seasonal patterns of use for heating and cooling or refrigeration, for example.

Existing generating systems are built to accommodate local peak demand. Transmission grids today offer a limited geographic reach, spanning one or two time zones. They follow local demand curves and ramp up and down with the sun. But they must build their generating capacity for peak demand, usually weekday afternoons during summer heat spikes. Power plants that run at full capacity during peak hours or seasons may sit idle during non-peak hours or seasons, and may have to be expensively "ramped up" to full capacity once the peak hours or seasons return. For example, North American power plants sit idle at night, as there is relatively little demand for electricity during that time. At the same time, power plants in Asia may be running at full capacity. Asia would likely import electricity to meet demand if given the opportunity. Building generating capacity to meet peak local demand is expensive for consumers, who have to pay a premium at all hours to obtain electricity during peak demand hours. Building for peak capacity is likewise inefficient for utilities and generators, which suffer depreciation losses and lost profits while plants sit idle during non-peak demand. Still other drawbacks are present in current approaches.

BRIEF DESCRIPTION OF THE DRAWINGS

Various aspects of the present disclosure and many of the attendant advantages thereof will become better understood with reference to the detailed description and accompanying drawings, wherein.

DETAILED DESCRIPTION

Figure 1A:
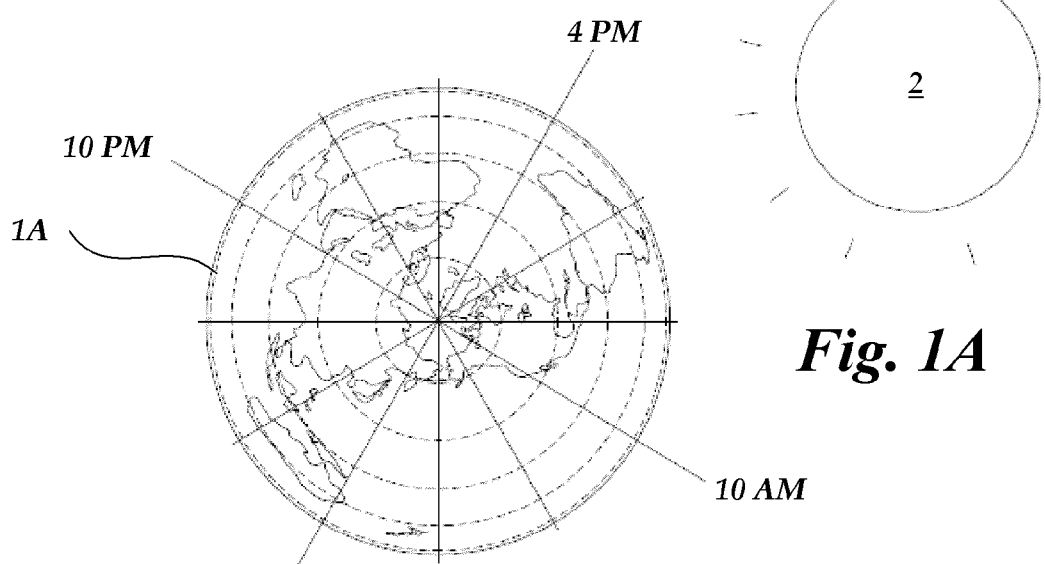
FIG. 1A, FIG. 1B, FIG. 1C, and FIG. 1D are conceptual diagrams illustrating the daily progression of daylight hours across various regions of the Earth.

The present disclosure generally relates to a computerized, network-based energy management system. More specifically, aspects of the present disclosure relate to a predictive energy transmission system that matches predictable peaks in demand with predictable troughs, moving energy from underutilized generating capacity in areas of low demand to areas of peak demand. In some embodiments, energy may be moved across hemispheres, such that energy is transmitted from one side of the globe to the other. In this regard, underutilized capacity on the dark side of the planet may be used to match and meet demand on the sunny side. More generally, the energy management system may improve the efficiency of energy infrastructure by directing energy from areas that may have a surplus of energy generation capacity to areas across the globe with a high demand for energy.

In some instances, energy can be redirected in real time or near-real time to meet increases in demand. Transmission losses between areas may be advantageously minimized by employing a network of high-temperature superconducting wires carrying direct current, which in some embodiments, is carried at high voltage. Such areas may be states, countries, continents, or even hemispheres apart. Areas may also be separated by one or more time zones (e.g., six, or between six and twelve time zones), or by having different climates (as may be determined by lying at different latitudes, having different Koppen climate classifications, having different average temperatures throughout the year, etc.). It will be recognized, however, the energy management system may employ superconducting or non-superconducting wires as desired.

Each area may have one or more energy management stations or "base stations" for connecting a local power grid to the network of superconducting energy conduits, which may include one or more wires composed of a superconducting material and coolant to keep the superconducting material in a superconducting state. An AC-to-DC rectifier may be used to convert alternating current generated by a power plant to direct current to be carried by the superconducting wire network. The direct current carried by these superconducting wires may be converted at another area's base station into alternating current for use with conventional power grids, using conventional DC-to-AC inverters. The base station may also include a computerized system for detecting shortages or surpluses of energy in the area, and for analyzing consumption or generation patterns of energy. Each base station may communicate offers to supply energy or requests for energy to one or more other base stations, or to a stand-alone controller computing device that coordinates energy routing among the base stations. The base stations may open or close switches along the superconducting energy network based on the offers to supply energy or the requests to receive energy to cause energy to be routed from provider areas to areas of need.

One or more sensing cooling pumping stations (SCPS's) may be included in the path of an energy conduit traveling from one base station to another. The SCPS may be configured to cool the superconducting energy conduits, e.g., by refrigerating and pumping liquid nitrogen or another coolant used to cool the superconducting energy conduits. An SCPS may also be configured to monitor the flow of energy through a portion of the energy conduit passing through it. Further, an SCPS may include a switch that can be operated by a base station to route energy or conduct energy flow. For example, energy may be routed to a need area by closing switches of SCPS's along an energy conduit that connects a provider area to the need area. SCPS's along other energy conduits may have their switches opened by a base station.

In some embodiments of the present disclosure, the energy management system may identify a first area in which a high energy demand is present, or an area in which an energy shortage may be present. The system may also identify a second area with an unused energy supply or an energy surplus. Energy may be routed through the network of energy conduits from the second area to the first area to meet the first area's demand. Several variations on these embodiments are possible. In one embodiment, energy derived from specific types of generation are routed from the second area to the first area. For example, consumers or utilities may specifically demand renewable energy, so energy from wind farms may be directed from an area that includes a wind farm to harvest energy to an area connected to a local power grid to which the consumers or utilities are connected. Types of energy sources may also be ranked based on how much pollution or carbon they produce as byproducts, with cleaner energy sources (e.g., renewable energy sources such as wind, hydroelectric, solar, geothermal etc.) being ranked ahead of energy sources that produce relatively more pollution or carbon (e.g., nuclear, natural gas, coal, etc.).

In some embodiments of the energy management system, specific types of generating capacity are instructed to produce substantially constantly when available, while less-preferred types of generating capacity are idled in the absence of demand. In some embodiments, renewable energy sources such as wind, solar, geothermal, and hydro receive preferential treatment, which preferential treatment may be based on, for example, low carbon emissions, low fuel costs, or the very renewability of the energy source. By contrast, energy sources that run on coal and fossil fuels may be less preferred for energy generation. Advantageously, this approach could encourage the development and investment in renewable generation, while discouraging non-renewable, polluting, carbon-intensive sources.

The energy management system may also be configured to predict energy needs or surpluses for particular areas. For example, the system may gather information regarding energy generation and consumption patterns over several areas, and may use the information to identify in advance areas that may predictably need energy or that may have surplus energy. This information may be used to model, for example, daily, weekly, monthly, seasonal, or yearly energy generation and consumption patterns. This information may also include the demographic makeup of a particular area, such as a list of energy consumers broken down by residential, commercial, and industrial consumers. Further, the system may gather information about the types of energy produced or consumed in a particular area. For example, a particular area may only generate renewable energy, or may include customers that wish to purchase renewable energy. Still other predictions and implementations are possible.

In another aspect, the present disclosure relates to Superconducting Magnetic Energy Storage (SMES). If the system detects at a given time that the electrical generation capacity over the entire network exceeds the demand for energy across all local power grids connected to the network (or a subset of local grids connected to the network), the system may route the "excess" electricity in a path that circulates through the network of superconducting wires instead of routing the electrical current to a base station and to users of a local grid. In this respect, the circulating excess energy may be stored for future use and released by the system to meet spikes in demand. This surplus energy may also be used to further cool the superconducting wire (e.g., by routing the surplus energy to a base station or to an SCPS that includes a refrigerator and coolant pump) so that the superconducting wire will have the capacity to conduct more current and the related ability to store more energy. Alternatively, a base station or SCPS may pump one coolant out of the system and replace it with another coolant with a lower condensation temperature (e.g., pumping out liquid nitrogen and pumping in liquid helium), thereby quickly and radically increasing the storage capacity of the system as a Superconducting Magnetic Energy Storage (SMES) system.

"Excess" energy in the superconducting energy network can be stored in other ways as well. For example, the excess electrical energy can be converted into potential energy in an energy storage facility that can generate and/or release electrical energy as the need arises. In a particular example, the energy storage facility may include pumped hydro storage that can pump water up into a caldera that is in fluid communication with a body of water, such as an ocean. The caldera may be fitted with or made into a reservoir for storing the pumped water in a relatively high location (e.g., a location at which the water would have relatively high gravitational potential energy) near an offshore turbine or other hydroelectric generation facility. The water can then be released from the reservoir to drive the turbine to generate electricity in response to demand. Excess electricity can also be used to charge rechargeable batteries, capacitors, or other energy storage devices.

The present disclosure offers several advantages. Notably, connecting grids (whether across short distances or long distances) could allow higher and more efficient utilization of existing energy-generating capacity globally, advantageously reducing the need to construct additional capacity. For example, energy may be provided consistently throughout the day by a power plant, which may provide energy to an area local to the power plant during the local area's peak hours, and which may provide energy to a remote area (via the superconducting energy conduits) during off-peak hours for the local area. The increased energy expenditures incurred by starting and stopping generators at such power plants (as opposed to running the generators at a relatively consistent rate) may be advantageously reduced.

In some embodiments, "peak hours" refers to a period from about 8 am local time (e.g., local to the area consuming the energy) to about 4 pm local time, when energy consumption is greatest. Similarly, "off peak hours" refers to the twelve-hour period during which energy consumption is at its lowest, typically occurring between about dusk and about dawn. The remaining time periods during the day, between dawn (e.g., sunrise) and 8 am local time, and between 4 pm local time and dusk (e.g., sunset) may be characterized as "in balance period." At any given time during a day, about only ¼ to about ⅓ of the world is experiencing peak hours, while about ½ of the world is asleep, and experiencing off peak hours. In one embodiment, energy generation and distribution is controlled to generate energy in areas experiencing off peak hours and distributing or transmitting that energy to areas of the globe experiencing peak hours.

Further, because electricity can be transmitted with a minimum of transmission losses over superconducting energy conduits, energy can be "on-ramped" by obtaining energy from remote regions and providing it to far-away consumers in more populated regions. In a particular example, wind farms placed in remote, energy dense locations such as the Gulf of Alaska and the Aleutian Islands, Greenland, or Tasmania, which may have relatively few consumers in their immediate vicinity, could provide energy to more populated areas via the superconducting energy conduits. In another example, natural gas from remote locations such as the North West of Australia or from the Bakken Shale in North Dakota can be used to generate electricity on-site or at a nearby location, which electricity may be transmitted via the energy network to more populated areas. This approach advantageously eliminates the need to compress and ship fuel (e.g., natural gas, etc.) to power plants that may be located near more populated areas. In still another example, geothermal energy obtained from remote locations such as Iceland or the Pacific Rim's "Ring of Fire" may be provided to more populated regions via the energy network. Still further advantages may be achieved according to the principles of the present disclosure. Opportunities for arbitraging energy between areas may be more readily achieved, for example.

With reference now to FIG. 1A, FIG. 1B, FIG. 1C, and FIG. 1D, several views of the Earth as it rotates through positions 1A, 1B, 1C, and 1D are shown with respect to sun 2. When taken in conjunction with FIG. 2, which depicts a global energy network 100, the principles of the present disclosure may be more readily appreciated.

At position 1A, as shown in FIG. 1A, the western hemisphere is facing the sun 2. Portions of the western hemisphere experience daylight conditions across various time zones between 10 am and 4 pm local time. The western hemisphere may experience its greatest demand for energy during these hours. Likewise, portions of the eastern hemisphere experience nighttime conditions across various time zones between 10 pm and 4 am local time. The eastern hemisphere may experience its trough for energy demand at this time, and thus may have surplus energy or the generation capacity to generate energy that exceeds the energy demand in the eastern hemisphere. Accordingly, energy may be routed through the energy network 100 from energy sources in the eastern hemisphere to consumers of energy in the western hemisphere, as discussed further below.

Figure 1B:
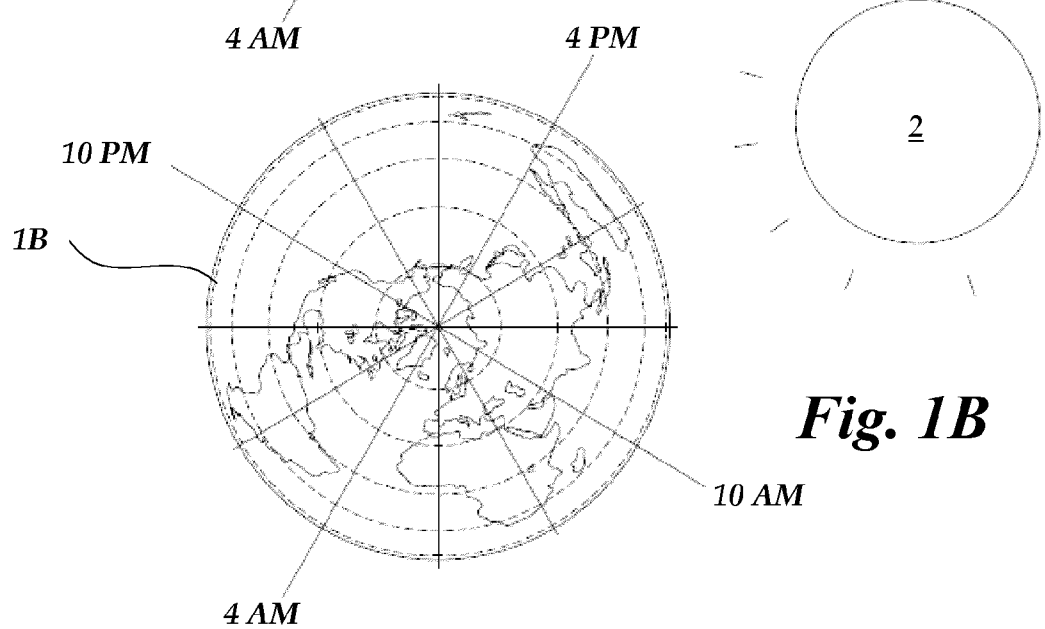

At position 1B, as shown in FIG. 1B, the eastern hemisphere is facing the sun 2. Portions of the eastern hemisphere experience daylight conditions across various time zones between 10 am and 4 pm local time. The eastern hemisphere may experience its greatest demand for energy during these hours. Likewise, portions of the western hemisphere experience nighttime conditions across various time zones between 10 pm and 4 am local time. The western hemisphere may experience its trough for energy demand at this time, and thus may have surplus energy or the generation capacity to generate energy that exceeds the energy demand in the western hemisphere. Accordingly, energy may be routed through the energy network 100 from energy sources in the western hemisphere to consumers of energy in the eastern hemisphere.

Figure 1C:
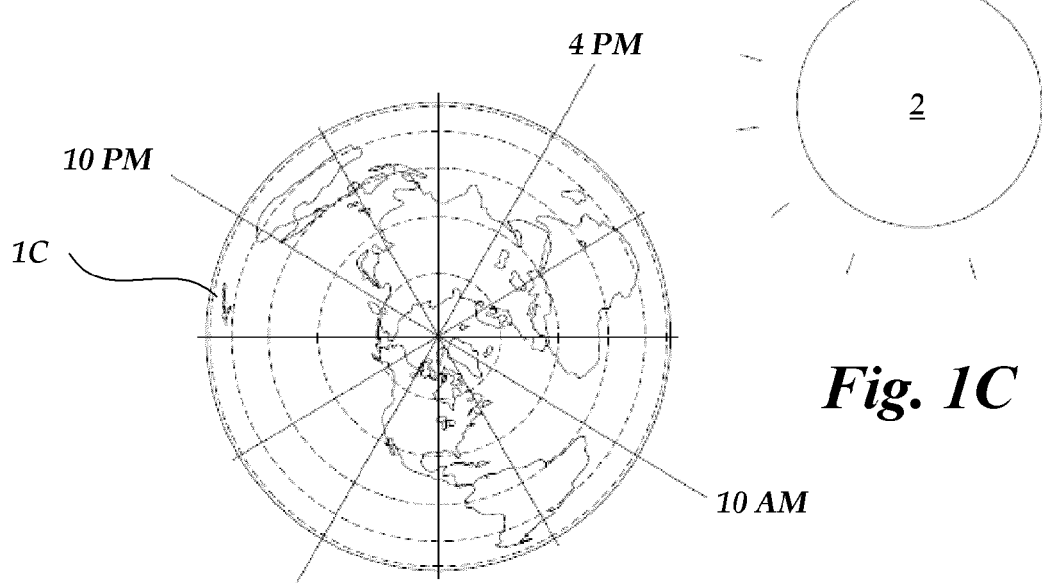

At position 1C, as shown in FIG. 1C, Africa, the Middle East, Russia, and Europe are facing the sun 2. These regions experience daylight conditions across various time zones between 10 am and 4 pm local time. Thus, they may experience their peak demand for energy during these hours. Likewise, the countries of the Pacific Rim experience nighttime conditions across various time zones between 10 pm and 4 am local time. The western hemisphere may experience its trough for energy demand at this time, and thus may have surplus energy or the generation capacity to generate energy that exceeds the energy demand in the Pacific Rim. Accordingly, energy may be routed through the energy network 100 from energy sources in the Pacific Rim to consumers of energy in Africa, the Middle East, Russia, and Europe.

Figure 1D:
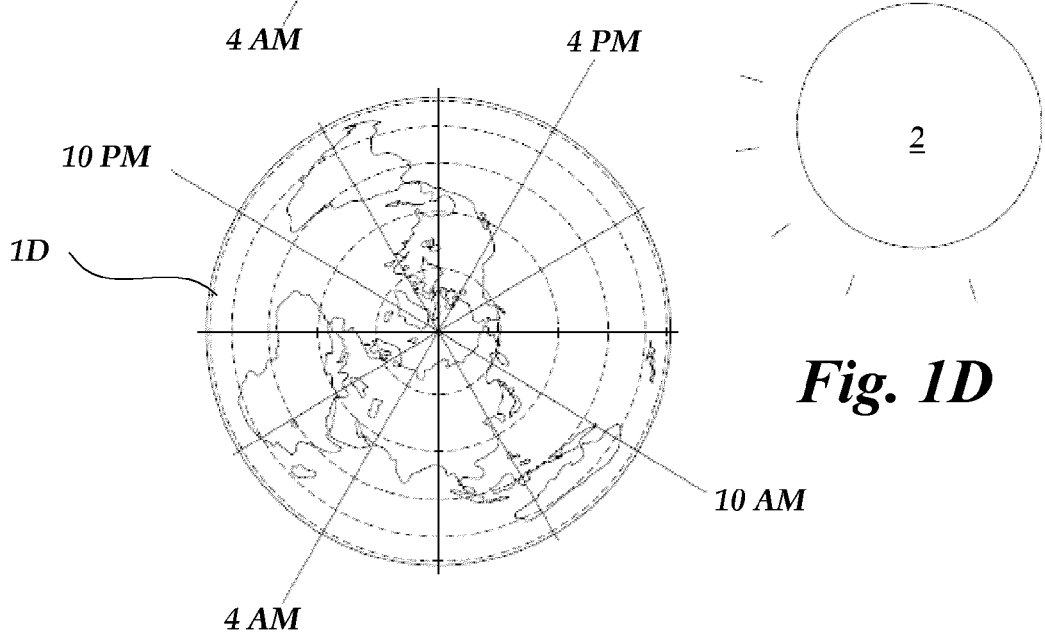

At position 1D, as shown in FIG. 1D, the Pacific Ocean is facing the sun 2. Portions of the Pacific Ocean experience daylight conditions across various time zones between 10 am and 4 pm local time. However, relatively few consumers may demand energy, as those portions of the Earth facing the sun at position 1D are relatively sparsely populated. For example, it may be any time between 10 am and 4 pm local time in one or more of Hawaii-Aleutian Standard Time, Samoa Standard Time, or Chamorro Standard Time. Meanwhile, many of the most populated areas of the planet, such as Africa, the Middle East, Russia, and Europe, experience nighttime conditions across various time zones between 10 pm and 4 am local time. The earth as a whole may experience its trough for energy demand at this time, a surplus of energy or generation capacity may exist across the entire energy network 100. Accordingly, energy may be routed through the energy network 100 from energy sources in the earth as a whole to one or more energy storage facilities, which may include pumped hydro storage facilities, caldera storage facilities, superconducting magnetic energy storage facilities, idle electric car batteries, and the like.

Figure 2:
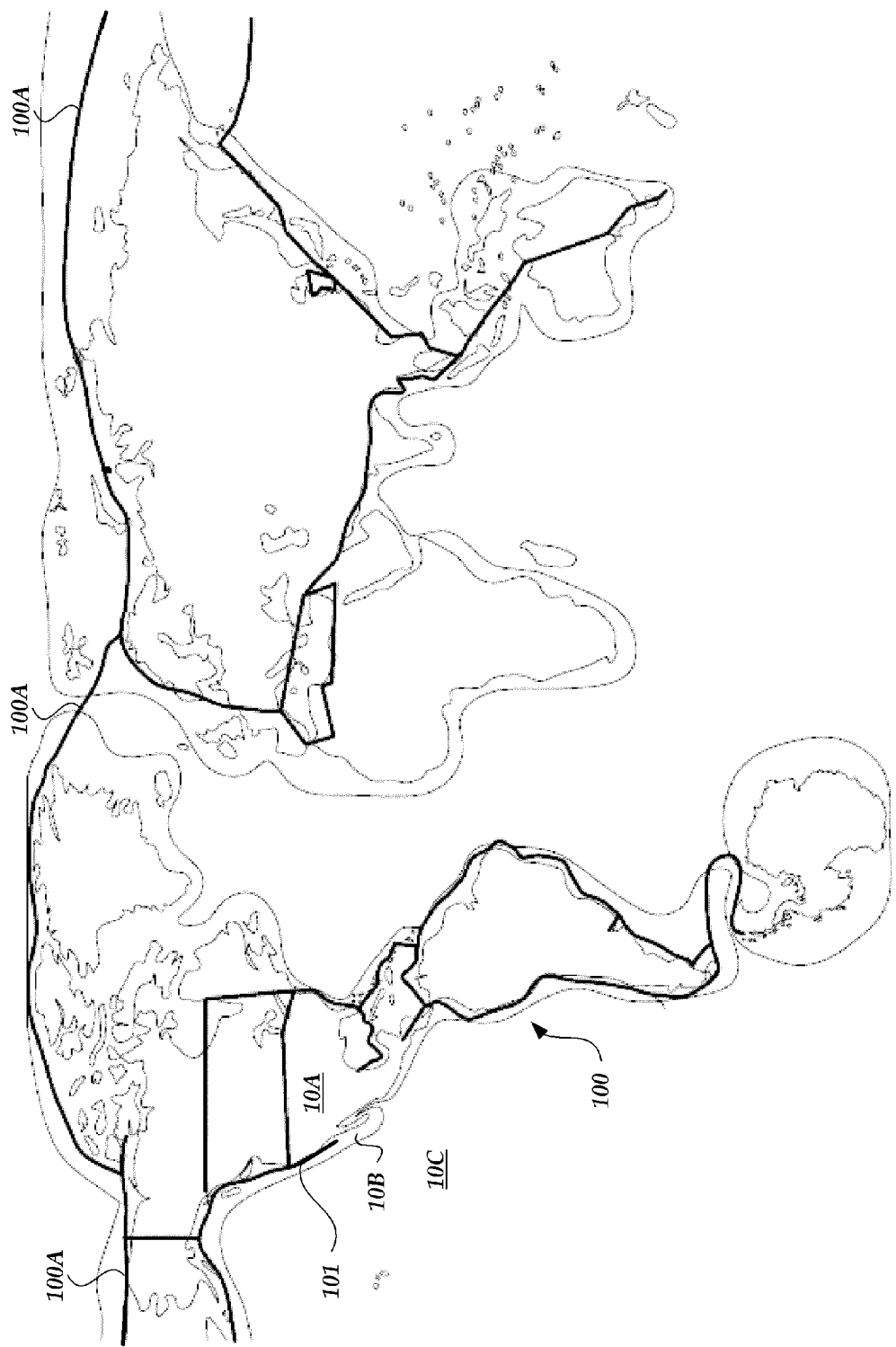
FIG. 2 is a conceptual diagram of a global energy network that includes energy conduits that travel along various continental shelves.

With specific reference now to FIG. 2, the energy network 100 is discussed in further detail. It will be recognized, however, that smaller, more local implementations of the energy network 100 are possible. The energy network 100 may include one or more energy conduits 101, which may carry electrical energy between one or more areas, which may be miles, time zones, continents, or hemispheres apart, and which may be geographically contiguous or separated by land, water, or both. For example, as discussed above with respect to FIG. 1A, FIG. 1B, FIG. 1C, and FIG. 1D, the energy network 100 may be capable of transporting energy from a hemisphere that has a surplus of energy relative to its generating capacity during the nighttime to a hemisphere that has a demand for energy during the daytime. One or more of the energy conduits 101 may in some embodiments include a superconductor wire so as to minimize transmission losses between areas.

In some embodiments, the energy network 100 is implemented as a network of energy conduits 101 (indicated by thick black lines) that may travel in part across one or more landmasses 10A and may travel underwater along the continental shelves 10B. An underwater energy conduit 101 may connect with a terrestrial energy conduit 101, or an energy conduit 101 may include both terrestrial and submerged portions, as discussed below with respect to FIG. 3.

In some embodiments, portions of the energy network 100 may also travel through deep ocean 10C, which deep ocean may correspond to portions of the ocean that are not situated on a continental shelf 10B. The network 100 of energy conduits 101 may further include a "looped" or circumpolar portion 100A in the Arctic (e.g., arranged about the geographic North Pole) to which the energy conduits 101 may be electrically connected. Electrical energy may be routed through the looped portion 100A continuously for storage (e.g., by selectively opening and closing switches along the other energy conduits 101, as discussed in further detail below). If the energy conduits 101 of the looped portion include superconducting wires, the looped portion 100A may be operated as a superconducting magnetic energy storage facility. It will be recognized that any cyclical grouping of energy conduits 101 may be operated in such a manner, whether located on land or underwater.

Figure 3:
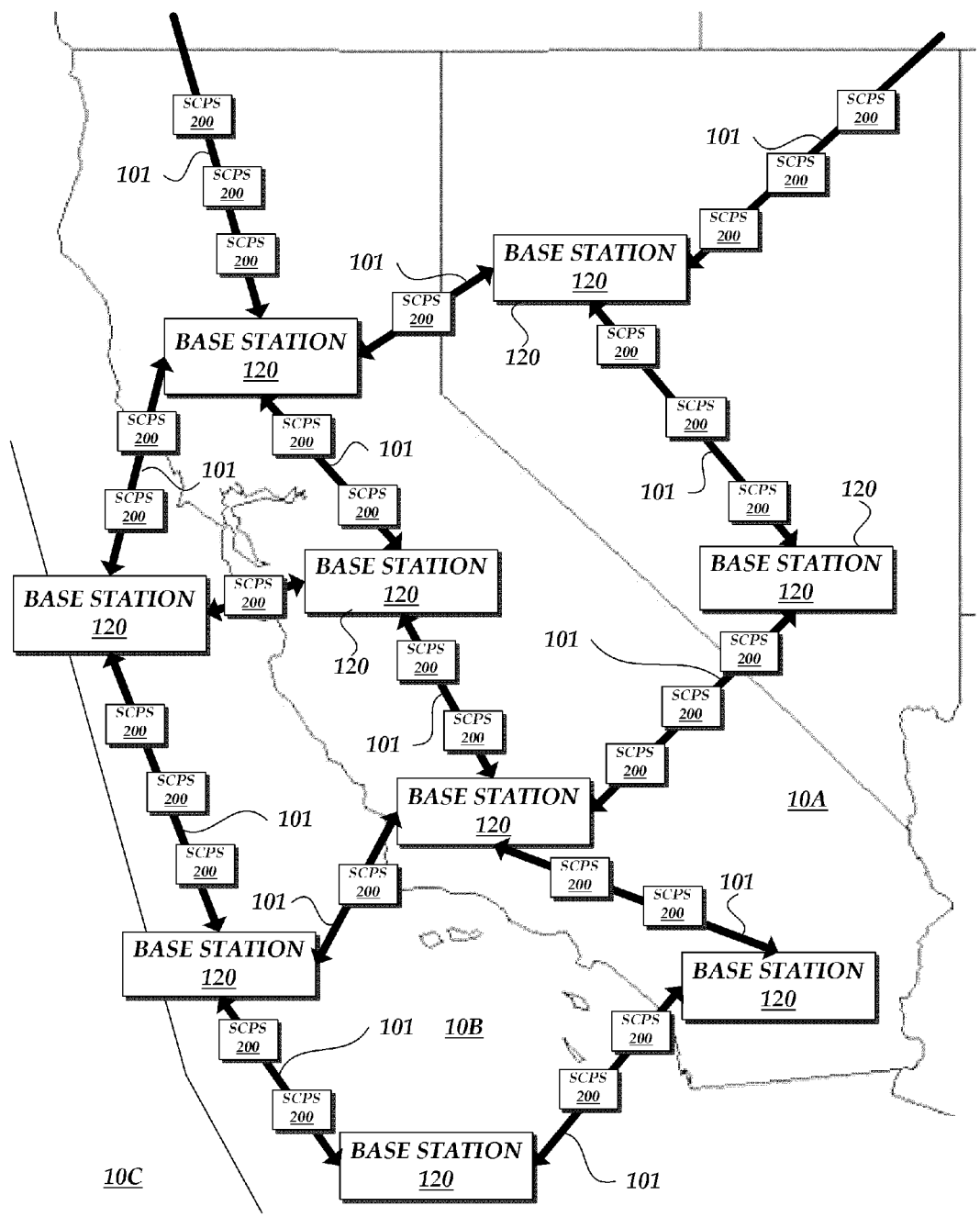
FIG. 3 is a block diagram depicting a high-level view of an illustrative environment in which an energy network management system may operate.

With reference now to FIG. 3, a portion of the example energy network is shown in still greater detail. Each energy conduit 101 may include one or more wires that carry electrical current from one base station 120 to another base station 120. In some embodiments, the wires are composed substantially of a high-temperature superconductor (HTS) material and operated as high-temperature superconductors. Advantageously, electricity may be transmitted as high-voltage direct current (DC) over long distances (e.g., over oceans or hemispheres as shown in FIG. 2) via the HTS wires, with no losses due to resistance. In some embodiments, the HTS wires are configured to deliver energy at a rate of at least two gigawatts, at least three gigawatts, at least ten gigawatts, at least twenty-five gigawatts, or at any other rate of energy delivery. The energy conduit 101 may also transport coolant (such as liquid nitrogen, liquid helium, or any other coolant) to cool the HTS wires so as to maintain the HTS wires in a state of superconductivity. In some embodiments, each of the energy conduits 101 include switches that selectively electrically connect or disconnect them from the network 100 of energy conduits 101 (e.g., for routing energy from one area to another).

In some embodiments, the energy conduit 101 can pass over land or under water. An energy conduit passing underwater may pass along the continental shelf 10B adjacent to a continent 10A, as shown in FIG. 3, in which several of the energy conduits 101 pass underwater along the continental shelf off the Pacific coast of the United States. Energy conduits 101 may be placed about six hundred or more feet below sea level in some embodiments, in the so-called "dark zone" of the ocean above the continental shelf 10B. Placing the energy conduits 101 at such a depth may advantageously prevent interference with or damage to the energy conduits 101 from fishing operations, anchors, terrorism, and the like. In some embodiments, one or more energy conduits 101 are placed approximately one thousand feet below sea level. Any underwater energy conduits 101 may be anchored to the continental shelf floor using tethers, weights, or other known techniques for mooring cables, conduits, or the like. The energy conduits 101 are discussed further below with respect to FIG. 8 and FIG. 9.

The energy conduits 101 may provide electrical connectivity among one or more base stations 120. Along the path that an energy conduit 101 follows from one base station 120 to another base station 120 may be one or more SCPS's 200. Each SCPS 200 may include equipment (e.g., pump, motor, etc.) to pump coolant into the energy conduits 101; hardware and/or software for monitoring energy passing through the energy conduit 101 along which the SCPS 200 lies; and hardware and/or software for communicating with one or more base stations 120 or other SCPS's 200. In some embodiments, SCPS's 200 are placed approximately every ten to twenty kilometers or miles along an energy conduit 101. An SCPS 200 may be placed on land, or may be placed underwater. The SCPS's 200 may be regularly spaced or irregularly spaced. Further information pertaining to the SCPS's 200 is discussed below with respect to FIG. 6.

Figure 4:
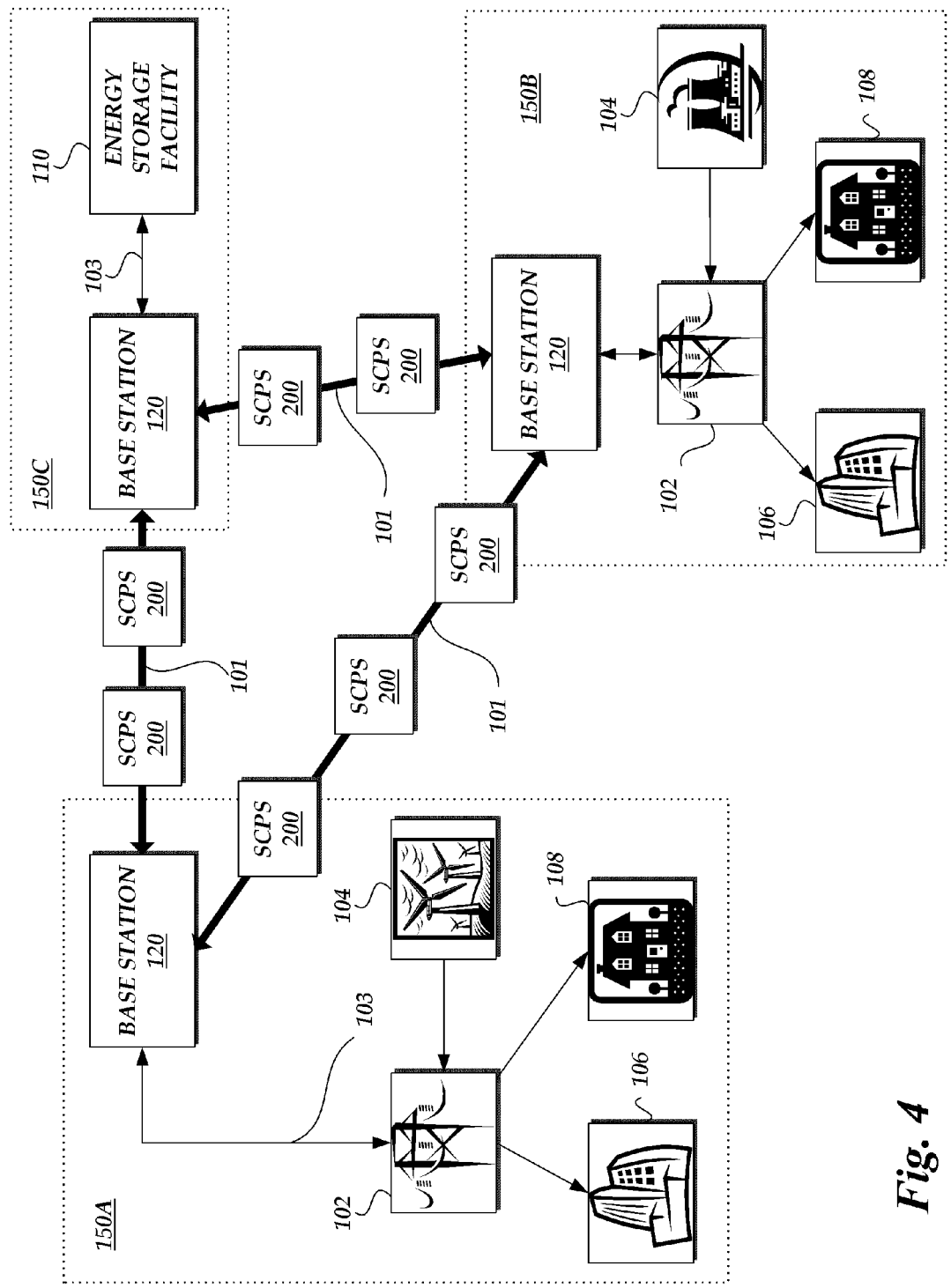
FIG. 4 is a block diagram depicting a detailed view of an illustrative environment in which an energy network management system may operate.

With reference now to FIG. 4, the example energy network 100 is shown in still greater detail. The example energy network 100 can connect one or more areas that include local power grids 102, energy sources 104, commercial consumers 106, and residential consumers 108. The power grid 102 may connect the energy sources 104, commercial consumers 106, and residential consumers 108 by alternating current (AC) electrical conduits 103. Each area 150A, 150B, and 150C may include a base station 120, which may be electrically connected to another base station 120 by a superconducting energy conduit 101, indicated by the bold solid line, substantially as discussed above with respect to FIG. 1A. Along each energy conduit 101, one or more SCPS's 200 may be provided.

The local grids 102 include conventional, alternating current (AC) electrical grids, as understood by those skilled in the art. The local grids 102 may be electrically connected to the base station 200 and to energy sources 104, commercial consumers 106, and residential consumers 108 by AC electrical conduits 103, such as conventional electricity-carrying wires as known in the art. The local grids 102 may also be electrically connected to a base station 120 in their respective areas.

Energy sources 104 may include any source that may provide electricity to the local grid 102. In some embodiments, these energy sources 104 may be categorized by how they generate energy. For example, one category of energy source 104 may include renewable or "green" energy sources, such as wind energy sources (e.g., wind farms), geothermal energy sources, hydroelectric energy sources (e.g., dams), solar energy sources, or other renewable energy sources. Another category of energy source 104 may include non-renewable or polluting energy sources, such as coal plants, natural gas plants, nuclear plants, etc.

In some embodiments, the energy sources 104 may also be ranked according to the amount of carbon or other types of pollution emitted. Energy from cleaner energy sources 104 may be selected ahead of dirtier energy sources 104 to be preferentially routed to consumers to meet demand. For example, renewable energy sources emit the least carbon monoxide or carbon dioxide during operation. Nuclear energy sources may also not emit any carbon, but do create nuclear waste and heat pollution. Natural gas power plants emit some carbon, but not as much as coal-fired power plants. Accordingly, an example ranking might be renewable energy sources, nuclear energy sources, natural gas power plants, and then coal-fired power plants. Other rankings are possible. For example, rankings may be based on the price of energy from each energy source 104, as might be measured by dollars per kilowatt-hour. Sources might also be given a higher ranking based on predictability (e.g. coal-fired baseload generation versus intermittent wind) or accessibility (the ability of certain sources, like hydro and natural gas, to quickly ramp up and down in response to demand).

Each local grid 102 may provide electricity to consumers of electricity. In some embodiments, these consumers may be categorized. For example, the local grid 102 may provide electricity to commercial consumers 106, such as businesses, factories, offices, retail stores, warehouses, etc. The local grid 102 may also provide electricity to residential consumers 108, which may include homes, apartment buildings, condominiums, etc. Other categories of consumers may receive electricity from the local grid 102, such as schools, government buildings, water transport systems, etc. Further categories are possible. Additionally, each category of consumers may be broken down into sub-categories. For example, commercial consumers 106 may be broken down by the type of business served (industrial, retail, hospitality, service industry, etc.).

Local grids 102, energy sources 104, commercial consumers 106, and residential consumers 108 may be organized into areas, such as area 150A and area 150B. Generally described, an area may include a region across which geographic characteristics and other characteristics related to energy consumption and energy generation are relatively consistent. For example, an area may lie within a single time zone (and thus have consistent peak hours and off-peak hours throughout), may include a certain number of people, and may have a single type of climate that is consistent across the entire area and thus have consistent peak seasons and off-peak seasons throughout. Peak demand and off-peak demand would presumably follow in said areas.

Each area 150A, 150B, and 150C may have a base station 120. Generally described, the base station includes an arrangement of physical hardware and software that provides an interface between the area's local grid 102 and the energy conduits 101 of the superconducting energy network. The base station 120 may also be configured to communicate over a communications network with another base station 120 to transmit requests for energy and offers to provide energy. The communications network may include a wired network, wireless network or combination thereof that includes one or more wired and/or wireless communications links lover which the base stations 120 and/or the SCPS's 200 may communicate with one another. In addition, the communications network may be a personal area network, local area network, wide area network, cable network, satellite network, cellular telephone network, or combination thereof. Protocols and components for communicating via the Internet or any of the other aforementioned types of communication networks, such as TCP/IP protocols, are well known in the art, and need not be discussed further herein.

The base station 120 may also be able to communicate with an SCPS 200 via the communications network (e.g., to obtain data from the SCPS 200 or to provide instructions to the SCPS 200). The base station 120 may also cause energy to be routed through the network of energy conduits 101 by opening or closing switches included in an SCPS 200 to direct energy from one area to another. For example, a base station 120 may receive requests for energy from a base station 120 in another area, select a provider area based on offers that may be provided by a provider area's base station 120 (which provider area may be the area associated with the first base station 120), and cause energy to be routed from the provider area to the area for which energy was requested.

Some areas may also (or instead) include an energy storage facility 110, as shown with area 150C. An energy storage facility 110 may store energy for future use. This energy may be obtained from the energy network 100 via an energy conduit 101 and via a base station 120 to which the energy storage facility 110 is electrically connected. In some embodiments, the energy storage facility 110 may be electrically connected to the base station 120 via an AC electrical conduit 103, while in other embodiments, the energy storage facility 110 may be electrically connected to the base station 120 via a DC electrical conduit.

In some embodiments, an energy storage facility 110 may include one or more loops of superconducting wire that may be operated as a superconducting magnetic energy storage (SMES) facility. In other embodiments, an energy storage facility 110 may include a caldera for use with a water pumping system, which water pumping system may pump water to the top of the caldera during surplus periods and may release the water to turn a turbine during periods of relatively greater demand. Caldera energy storage is discussed further below with respect to FIG. 7A and FIG. 7B.

Figure 7A:
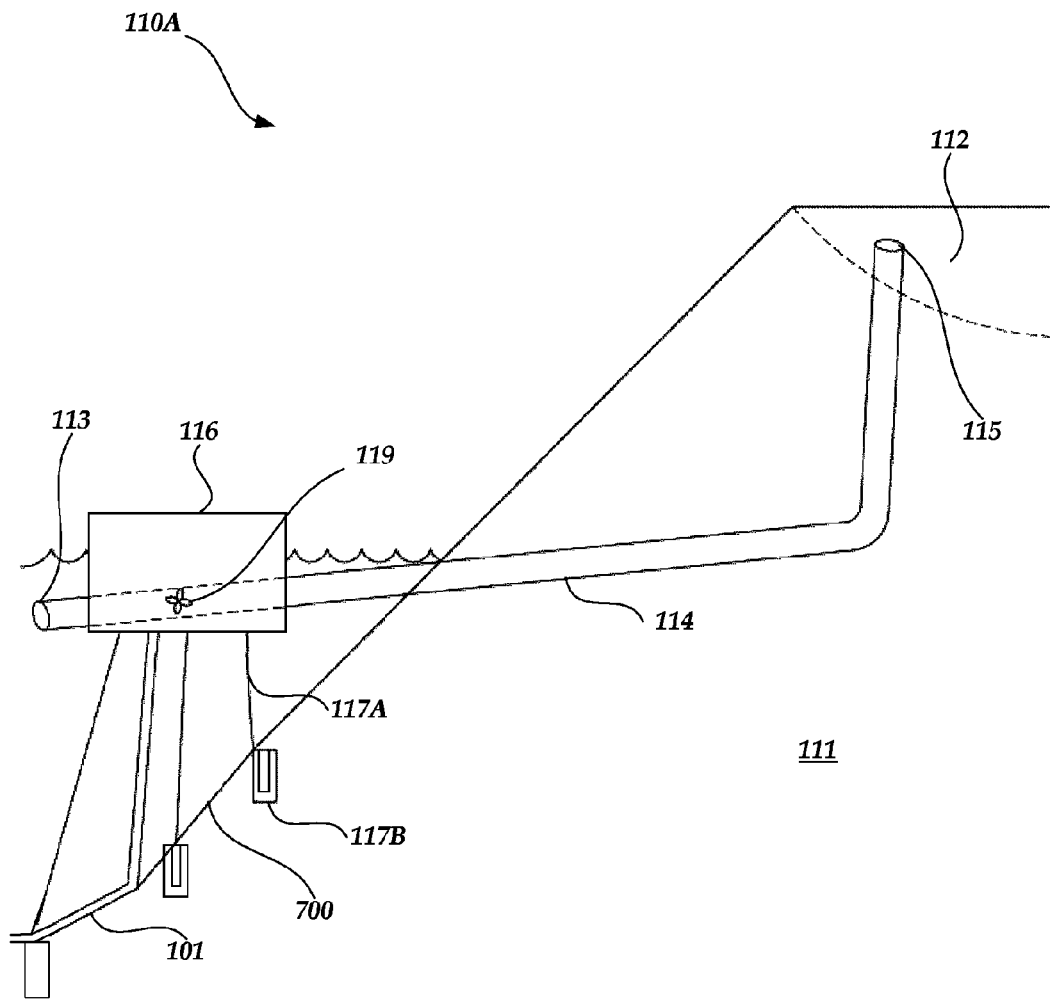
FIG. 7A is a schematic diagram depicting an illustrative energy storage facility that includes a caldera.
Figure 7B:
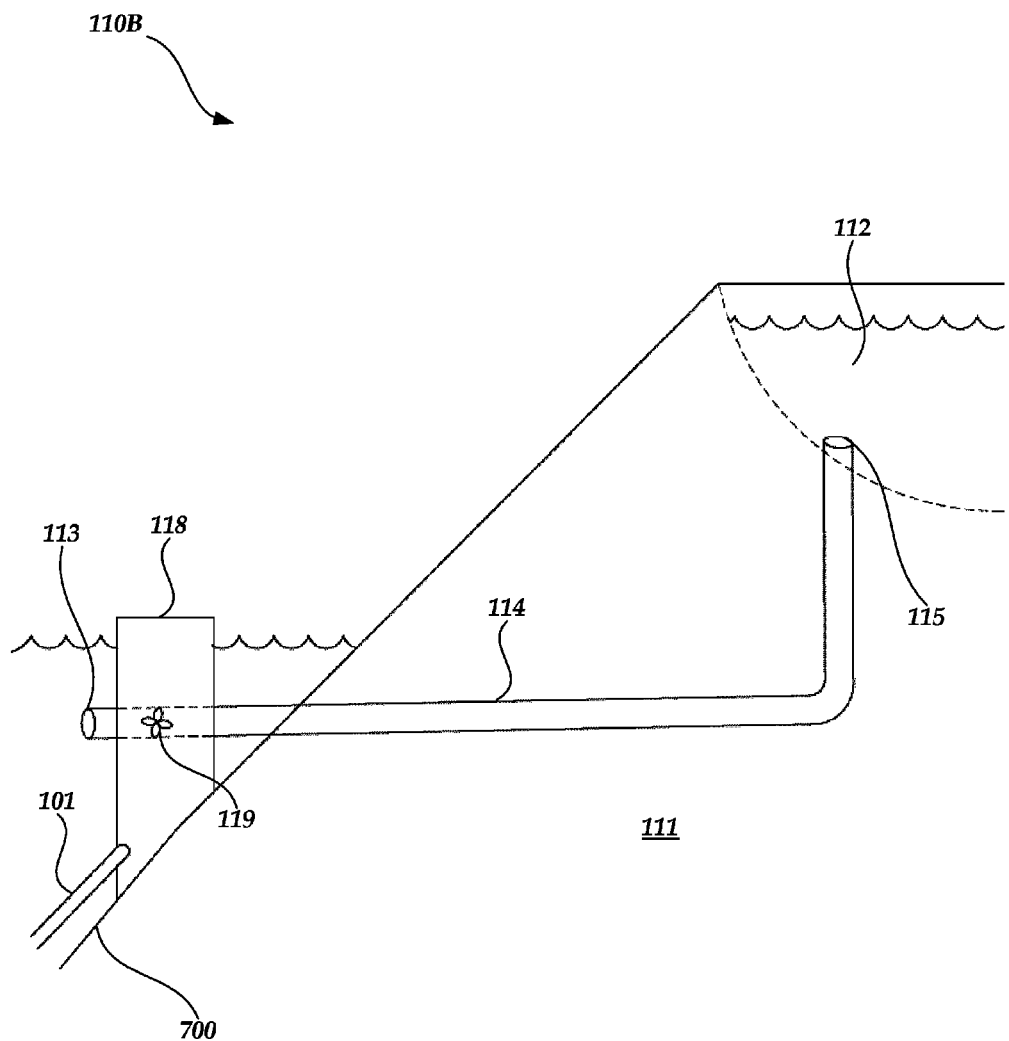
FIG. 7B is a schematic diagram depicting an illustrative energy storage facility that includes a caldera.

Additionally, in some embodiments, an energy storage facility 110 connects directly to an energy conduit 101, without a base station 120 necessarily being present in the area 150C in which the energy storage facility lies. Examples of such energy storage facilities 110 are shown in FIG. 7A and FIG. 7B and discussed further below.

Figure 5:
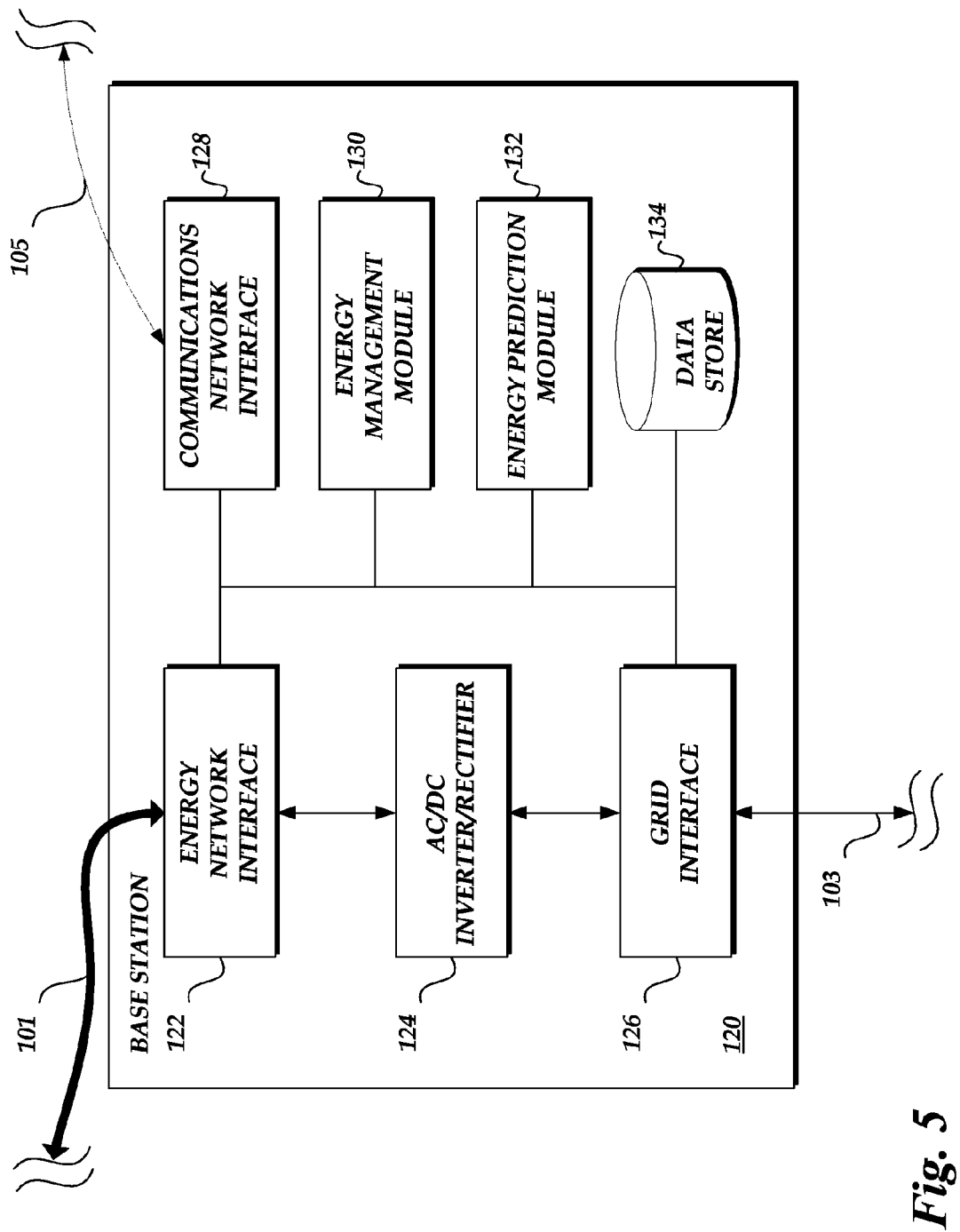
FIG. 5 is a schematic diagram depicting an illustrative base station that may be included in an energy network.

Turning now to FIG. 5, an illustrative base station 120 is shown. The base station 120 may generally include an arrangement of hardware, firmware, and/or software configured to implement components including an energy network interface 122; an AC/DC inverter/rectifier 124; a local grid interface 126; a communications network interface 128; an energy management module 130; an energy prediction module 132; and a data store 134. The energy network interface 122, AC/DC inverter/rectifier 124, and local power grid interface may be electrically connected. Components may also be connected by a communications bus, as are the energy network interface 122; the local grid interface 126; the communications network interface 128; the energy management module 130; and the data store 134.

The energy network interface 122 connects the base station 120 with an energy conduit 101. The energy network interface 122 may include one or more electrical meters that monitor the flow of electricity from the energy conduit 101 to the base station 120. The energy network interface 122 may communicate with the energy management module 130 to confirm that requested energy has arrived from another area, for instance, or to indicate that energy being obtained via the local grid 102 (not shown) of the area with which the base station 120 is associated is reaching the energy conduit 101.

The energy network interface 122 may also include one or more programmable logic controllers (or other hardware) configured to open or close one or more electrical switches along the energy conduit 101 so as to cause energy to be routed to or away from the base station 120. The base station 120 may receive a command to open or close one or more electrical switches from the controller computing device 300, and the energy network interface 122 may open or close the switches in response.

The energy network interface 122 may be electrically connected to the AC/DC inverter/rectifier 124. As discussed above, energy may be transmitted through an energy conduit 101 as direct current (DC). However, most local grids 102 run on alternating current (AC). Accordingly, the inverter/rectifier 124 may convert direct current received via the energy conduit 101 to alternating current to be provided to the local grid 102 (not shown). Alternately, if the base station 120 is to provide energy to another area via the energy conduit 101 (e.g., by drawing energy from an energy source 104 via a local grid 102), the inverter/rectifier may convert the alternating current provided via the local grid 102 to direct current to the energy conduit 101 to be carried to the other area (e.g., to a base station of the other area).

The local grid interface 126 may be electrically connected to the AC/DC inverter/rectifier 124. The local grid interface may include one or more transformers to step up the voltage of AC electricity drawn from a local grid 102 with which the base station 120 is associated for transmission via the energy conduit 101. The transformers may also step down the voltage of electricity obtained via the energy conduit 101 after the electricity is converted from DC to AC by the AC/DC inverter/rectifier 124. The local grid interface 126 may also include meters configured to determine the level of energy consumption or generation in the area with which the base station 120 is associated (e.g., by monitoring the local grid 102). Further, the local grid interface 126 may be connected via alternating current (AC) electrical conduits 103 to a local grid 102 (not pictured). Through the local grid interface 126, the base station 120 may draw power from an energy source 104 connected to the local grid 102, or may distribute energy obtained via the energy conduit 101 to the local grid 102 and eventually on to commercial consumers 106 and/or residential consumers 108 (not pictured).

The communications network interface 128 may provide connectivity over the communications link 105 with the communications network, e.g., to other communications networks or computer systems, such as one or more SCPS's 200 or one or more other base stations 120. The communications network interface 128 may generally be capable of communicating over any selected communications protocol, whether wired or wireless.

In some embodiments, the communications network interface 128 transmits requests for energy or offers to provide energy, which requests or offers may be generated by the energy management module 130 as further discussed below. Further, the communications network interface 128 may be configured to communicate with outside information sources that may have information pertaining to the energy needs or ability to supply energy of an area with which the base station 120 is associated. For instance, the communications network interface 128 may be configured to obtain weather data (e.g., to determine whether weather conditions are favorable for the generation of wind or solar power in the area); price data (e.g., to determine a unit price, spot price, or futures price of electricity in the area with which the base station 120 is associated or in other areas); status information regarding energy sources 104 in the area (e.g., to determine whether power plants, wind farms, solar farms, etc. in the area are operating at full or less than full capacity); and other information.

The energy management module 130 may generally administer the base station 120 and its connection to the energy conduits 101 on the superconducting energy network. For example, the energy management module 130 may generate requests for energy to be provided to other base stations 120, based on information obtained from the local grid interface 126, communications network 128, and/or the data store 134. In some embodiments, these requests for energy are generated by energy management module 130 in response to conditions that indicate that the area with which the base station is associated has a need for energy. For instance, the energy management module 130 may determine that the area with which the base station 120 is associated is experiencing relatively high demand for energy, has unmet energy demands, or is undergoing an energy shortage. In particular, non-limiting examples, the area with which the base station 120 is associated may have all of its energy sources 104 running at or near full capacity; or the area may be experiencing peak energy consumption hours (e.g., business hours) or a peak energy consumption season (e.g., summertime in warm climates or wintertime in cool climates). Alternately, one or more of the energy sources 104 may have failed (e.g., a generator may have been knocked offline), or conditions in the area may be unfavorable to renewable energy sources 104 (e.g., windless conditions for wind energy sources 104, cloudy conditions for solar energy sources 104, drought conditions for hydroelectric energy sources 104, etc.). Relatively high energy prices (as may be measured against, for example, an average or aggregate of energy prices in other areas, or against an average or aggregate of energy prices throughout the year of the area with which the base station 120 is associated) may also indicate a need for energy.

The energy management module 130 may also generate offers to provide energy to other areas, also based on information obtained from the local grid interface 126, communications network interface 128, and/or the data store 134. For instance, the energy management module 130 may determine that the area with which the base station 120 is associated has idle energy sources, or energy sources that are operating at less than full capacity. The area with which the base station 120 is associated may also be experiencing off-peak hours or off-peak seasons; that is, a time of day or time of year at which energy consumption is relatively low. There may also be few or no energy consumers in that particular area. Additionally, low energy prices may indicate that the provider area has energy to give. The offer to provide energy may be communicated to a controller computing device 300 (or another base station 120), which may accept or decline the offer. If the offer is accepted (e.g., the other base station 120 or the controller computing device 300 responds with a request for energy or an acceptance), the energy management module may cause the local grid interface 126 to obtain electrical energy from an energy source 104 via the local grid 102. This electrical energy, which may be obtained as alternating current from the local grid 102, may be converted into direct current by the AC/DC inverter/rectifier 124, and provided via the energy network interface 122 to an energy conduit 101 of the energy network.

In some embodiments, requests for electrical energy designate a particular type of electrical energy to be provided to the base station 120. For example, information stored in the data store 134 may indicate that consumers in the area associated with the base station 120 have a preference to obtain their energy from a renewable energy source, such as a solar energy source, a wind energy source, a hydroelectric energy source, or a geothermal energy source. At high-peak demand, the request for energy may also specify that the requested energy come from an energy source 104 that includes an intermittent renewable energy source, such as a wind energy source or a solar energy source. As discussed above, in some embodiments, energy from an intermittent renewable energy may be stored with an energy storage facility as well. Accordingly, a request for electrical energy may be generated specifying that energy is to be provided from an area that includes a renewable energy source 104 (or from an energy storage facility 110 that stores energy produced by an intermittent renewable energy source) and transmitted to one or more other base stations 120.

In some embodiments, the energy management module 130 may facilitate the arbitrage of energy between one or more areas. For example, the energy management module 130 may obtain information about the price of energy in a first area from a base station 120 in the first area. The energy management module 130 may also obtain information about the price of energy in a second area from a base station 120 in the second area. If the second area's price to provide energy is less than the first area's price to provide energy, the energy management module 130 may request energy from the second area. The energy management module 130 may then offer to provide energy to a third area whose willingness to pay for energy exceeds the price at which the energy was provided by the second area. The price to provide the energy may be set in between the price of the first area to provide and the willingness to pay of the third area.

The base station may further include an energy prediction module 132 to predict when requests for energy and offers to provide energy should be made by the base station 120, based on information stored in the data store 134. For example, based on data stored in the data store 134, the energy prediction module 132 may determine that certain times of day or certain times of year coincide with increases or decreases in energy consumption or production. Accordingly, based on these cycles, requests for energy or offers to provide energy may be generated by the energy management module 130 and proactively communicated to one or more other base stations 120. In a particular, non-limiting application of this concept, the energy prediction module 132 may determine that daytime during the summer in an area having a hot climate coincides with very high energy consumption (e.g., so that consumers can run air conditioning, refrigeration equipment, etc.). Accordingly, when the next summer day comes, the prediction module 132 may generate a request for energy to be transmitted to another base station 120, without the energy prediction module 132 necessarily obtaining new data about consumption and generation in the area. Other cyclical patterns may be determined by the energy prediction module 132 and requests and offers may accordingly be proactively generated and transmitted.

The energy prediction module 132 may further forecast or predict the availability of one or more areas to supply energy to areas that may have energy needs. These predictions may be generated in a number of ways. In some embodiments, the energy prediction module 132 may predict when one or more areas may have a future need for energy based on previous requests for energy. For example, the base station 120's energy management module 130 may consistently transmit requests for energy during a certain time of day (for example, 6 am to 6 pm) for one or more days, or may consistently transmit requests for energy during a certain time of year (for example, from May to September in temperate latitudes of the Northern Hemisphere) over one or more years. Accordingly, the energy prediction module 132 may predict, based on the timing of the previous requests, a predicted time at which the area may have a future need for energy. When that time arrives, the energy prediction module 132 may direct the energy management module 130 to request energy. Similar predictions can be made to predict when an area may be available to provide or offer energy to other areas, based on when offers to provide energy are received by the base station 120. Other predictions may be generated from trends in energy consumption of the one or more areas, which information may be obtained from one or more other base stations 120, such as whether energy consumption in an area is increasing or decreasing over time (e.g., as the population of consumers in the area increases or decreases). Still further predictions are possible.

The data store 134 may generally include information about energy generation and consumption patterns for the area with which the base station 120 is associated. This information could include, for example, information about peak hours of the area; peak seasons of the area; overall energy consumption of the area; overall energy generation capacity of the area; the types of energy produced by energy sources 104 in the area; the unit price of energy in the area; the climate of the area; the time zone of the area; and other information. This information may be gathered, for instance, by meters provided with the local grid interface 126; or may be obtained over the communications network 110 via the communications network interface 128; or obtained via other means such as user input. This information may be provided to the energy management module 130, so that the energy management module 130 can determine whether the area with which the base station 120 is associated can be a provider area (whereupon an offer to provide energy to be transmitted over the communications network may be generated), or whether the area is an area of need (whereupon a request for energy to be transmitted over the communications network may be generated). The data store 134 may further include information about consumers' preferences for energy in the area associated with the base station 120. For example, consumers may express a preference for energy obtained from renewable energy sources (e.g., by opting into a renewable energy purchasing program with their local utility). Based on this preference information, the energy management module 130 may generate requests for specific types of energy, such as renewable energy. The data store 134 may further store information about contractual obligations to provide or purchase energy that may be associated with an energy source 104 in which the base station 120 lies. This information may be embodied in a set of rules that the energy management module 130 follows in generating requests to receive energy and offers to provide energy. The data store 134 may still further information about prices of energy in one or more area to facilitate arbitrage by the energy management module 130.

The data store 134 may be embodied in hard disk drives, solid state memories, and/or any other type of non-transitory computer-readable storage medium. The data store 134 may be distributed or partitioned across multiple storage devices as is known in the art without departing from the spirit and scope of the present disclosure. Moreover, while the data store 134 is depicted in FIG. 5 as being local to the base station 120, the data store 134 may be remote to the base station 120 as well.

In addition to the components shown, the base station 120 may include a memory, processing unit, user interface components, and non-transitory computer-readable medium drive, all of which may communicate with each other and with the components shown by way of a communication bus. The processing unit may communicate to and from memory containing program instructions that the processing unit executes in order to operate the base station 120 and its constituent components. The memory generally includes RAM, ROM, and/or other persistent and/or auxiliary, non-transitory computer-readable storage It should be noted that the devices discussed above need not be distinct or discrete. Devices may also be reorganized in the environment in which the energy management system operates. For example, a base station 120 may include some or all of the hardware and software components of an SCPS 200, and vice versa. Still other implementations are possible.

In the examples described above, the base stations 120 can communicate ad-hoc over the communications network via communication links 105. Thus, a first base station 120 may receive a request or offer for energy from a second base station 120. In response, the second base station 120 may transmit an offer to provide energy or an acceptance of the offer to the first base station 120. However, in other embodiments, a central controller computing device may be provided to route offers to provide energy, to route requests to receive energy, and to control the operation of one or more SCPS's 200. Still other implementations are possible.

Figure 6:
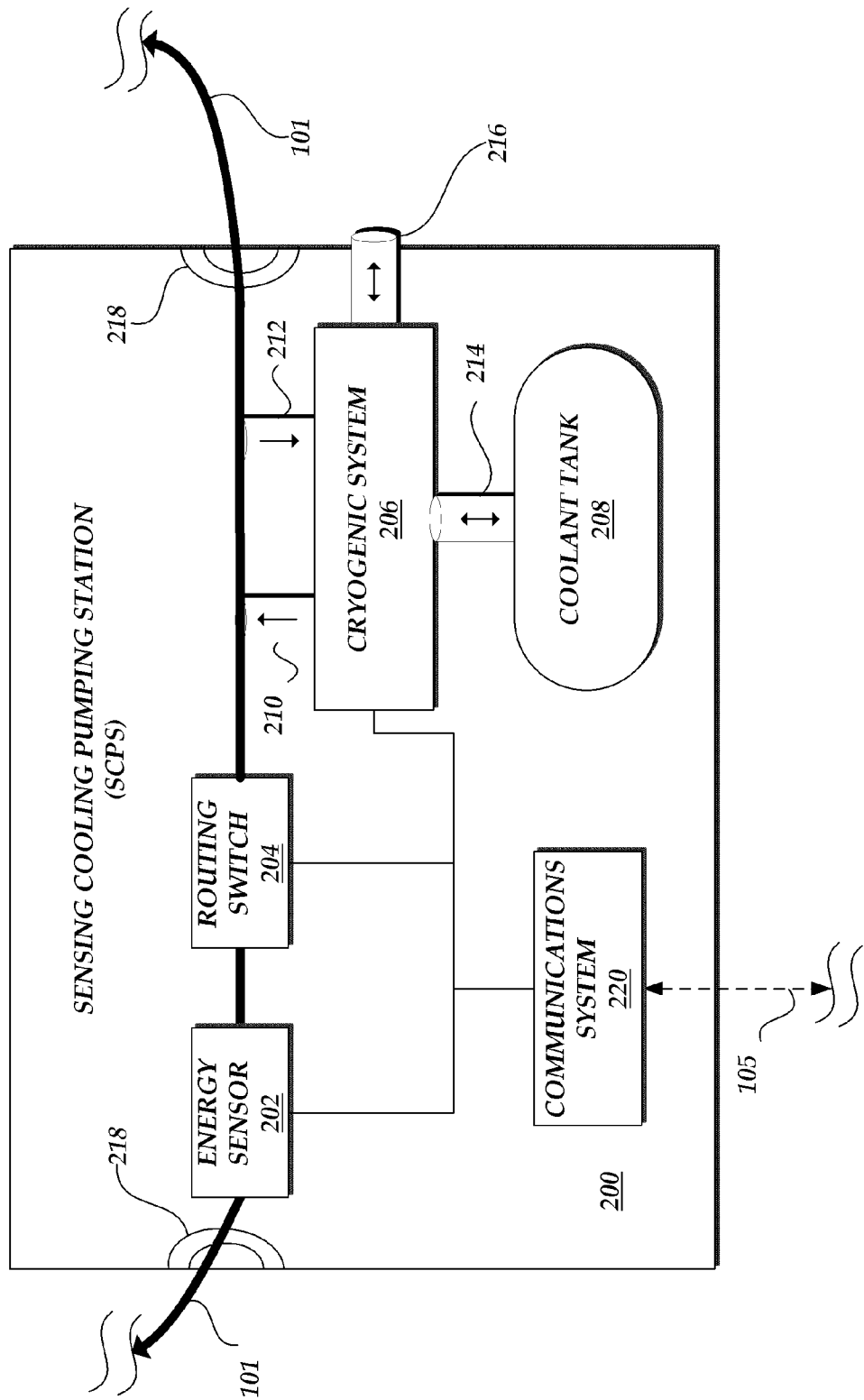
FIG. 6 is a schematic diagram depicting an illustrative sensing cooling pumping station (SCPS) that may be included in an energy network.

Turning now to FIG. 6, an example SCPS 200 is shown. In some embodiments, the SCPS 200 houses a segment of an energy conduit 101 that passes therethrough. The SCPS may also include an energy sensor 202, a routing switch 204, a cryogenic system 206, a coolant tank 208, a conduit intake port 210, a conduit exhaust port 212, a tank port 214, a cryogenic system intake/exhaust port 216, a communication system 220, and one or more conduit valves 218. The SCPS 200 may further include a housing to house one or more of these components. In some embodiments, this housing includes a substantially rectangular prism whose dimensions are eight feet in height, eight feet in width, and twelve feet in length. However, other dimensions and shapes for the housing are possible. If the SCPS 200 is to be placed underwater, the housing may be hermetically sealed and coated with a waterproof, corrosion-resistant material, such as a polymer coating, paint, or other suitable material.

The energy sensor 202 may monitor the energy flowing through the energy conduit 101. In some embodiments, the energy sensor 202 includes an ammeter that is in series with the energy conduit 101. In other embodiments, the energy sensor 202 includes a voltmeter that is in parallel with the energy conduit 101. One lead of the voltmeter may be placed where the energy conduit 101 enters the SCPS 200, while the other end of the voltmeter may be placed where the energy conduit 101 exits the SCPS 200. The energy sensor 202 may provide its readings to the communication system 220 for communication over the communications link 105 to a base station 120 or to another SCPS 200. For example, the energy sensor 202 can provide an indication that current is or is not flowing through the segment of the energy conduit 101 at which the SCPS 200 is located.

The routing switch 204 is a switch that may prevent or permit the flow of energy through the energy conduit 101. In some embodiments, the routing switch 204 is in series with the energy conduit 101, and may divide the energy conduit 101 into two portions that may be selectively electrically connected by the operation of the routing switch 204. The routing switch 204 may respond to a signal received by the communications system 220 over the communication link 105. For example, a first base station 120 seeking to route energy to a second base station 120 through the segment of the energy conduit 101 at which the SCPS 200 is located may send a signal to direct the SCPS 200 to permit the flow of energy through the energy conduit 101. The routing switch 204 may then permit the flow of energy through the energy conduit 101 (e.g., by providing a path for current to flow between the two divided portions of the energy conduit 101). On the other hand, if energy is not to be directed through the segment of the energy conduit 101 at which the SCPS 200 is located, the routing switch 204 may prevent the flow of energy through the energy conduit 101 (e.g., by removing or blocking a path to prevent current from flowing between the two divided portions of the energy conduit 101). Other electrical switching mechanisms known in the art may also (or instead) be included in the routing switch 204.

The cryogenic system 206 may compress and cool the coolant used to cool a wire included in the energy conduit 101. The cryogenic system 206 may obtain coolant from the coolant tank 208 via the tank port 214. The cryogenic system 206 may then pump the obtained coolant into the energy conduit 101 through the conduit intake port 210, such that the coolant is forced down the length of the energy conduit 101. The cryogenic system may also obtain evaporated coolant (e.g., nitrogen that, through heating, has changed from a liquid state to a gaseous state) through the conduit exhaust port 212. In some embodiments, the cryogenic system 206 may expel the evaporated coolant through the cryogenic system intake/exhaust port 216. In other embodiments, the cryogenic system 206 may recompress and cool the coolant, and pump it back into the energy conduit via the conduit intake port 210. In still other embodiments, the cryogenic system 206 may recompress and cool the coolant and provide it to the coolant tank 208 via the tank port 214 for storage. Coolant may also be provided from an external source to the cryogenic system 206 via the cryogenic system intake/exhaust port 216 (e.g., to replenish the coolant tank 208).

The cryogenic system 206 may also include sensors that can provide information to the communications link 220 for transmission over the communications link 105 to a base station 120 or to another SCPS 200. For example, the cryogenic system 206 may include sensors that indicate a temperature of the energy conduit 101; an amount of coolant in the coolant tank 208; a functional status of the cryogenic system 206 (e.g., working, malfunctioning, disabled, etc.); or any other information. The information obtained via these sensors may be provided to the communications system 220 for transmission over the communications link 105.

Examples of acceptable cryogenic systems 206 for inclusion in an SCPS include the cryogenic systems disclosed in U.S. Pat. No. 6,354,087 to Nakahara et al. entitled "METHOD AND APPARATUS FOR COOLING SUPERCONDUCTOR," which was filed on Jan. 21, 2000, and issued on Mar. 12, 2002. The disclosure of this patent is hereby incorporated by reference in its entirety. Other cryogenic systems 206 may be acceptable for inclusion in an SCPS 200 as well.

The coolant tank 208 may include an insulated tank that is capable of holding liquid nitrogen or another coolant at a relatively low temperature for an extended period of time. In some embodiments, the coolant tank 208 may include a double-walled tank. In between the two walls may be a vacuum or other insulator. Additionally, in some embodiments, the walls of the coolant tank 208 may be expandable, such that the coolant stored in liquid form may be permitted to evaporate and expand within the coolant tank 208. This implementation may be particularly advantageous for an underwater SCPS 208, as the controlled evaporation and condensation of coolant (which may be controlled by the cryogenic system 206) may be used as a ballast system to selectively surface or submerge the SCPS 200 (e.g., by allowing the evaporation of the coolant to surface the SCPS 200, or by submerging the SCPS 200 by condensing the coolant).

The SCPS 200 may further include one or more valves 218 that selectively enclose the energy conduit 101 as it enters into and exits from the SCPS 200. As discussed above with respect to the routing switch 204, the segment of the energy conduit 101 that passes through the SCPS 200 may be divided into two discrete portions. In a closed state, each valve 218 may ensure that the SCPS 200 remains in contact with the energy conduit 101. In an open state, each valve 218 may allow the SCPS 200 to disengage from the energy conduit 101 so that the SCPS 200 may freely move without dragging other portions of the energy conduit 101 with it. This implementation is particularly advantageous in the context of a selectively submersible underwater SCPS 200 as discussed above, so that by disengaging with the energy conduit 101, the SCPS 200 may surface without dragging the energy conduit 101 with it.

The communication system 220 may include an arrangement of hardware and software that enable the SCPS 200 to communicate over a communication link 105 with a base station 120 or another SCPS 200. For example, the communication system 220 may obtain readings from the energy sensor 202 or the cryogenic system 206 and provide them to a base station 120 or another SCPS 200, as discussed above. The communications system 220 may also receive from a base station 120 requests to open or close the routing switch 204 to permit or prevent the flow of energy through the energy conduit 101.

Energy drawn from the energy conduit 101 may be used to power the components of the SCPS 200 discussed above, such as the energy sensor 202, the routing switch 204, the cryogenic system 206, the valves 218, and the communications system 220. Transformers may be provided with the SCPS 200 to step down the high voltage direct current in the energy conduit 101 to a level usable by the energy sensor 202, the routing switch 204, the cryogenic system 206, the valves 218, and the communications system 220. One or more inverters may also be provided with the SCPS 200 to invert the high-voltage direct current into alternating current, which alternating current may be used to power the energy sensor 202, the routing switch 204, the cryogenic system 206, the valves 218, and the communications system 220 as well.

With reference now to FIG. 7A and FIG. 7B, in which like reference numerals reflect generally like elements, two example energy storage facilities 110A and 110B that include a caldera 111 are shown. These energy storage facilities 110A and 110B may be disposed near a body of water.

With specific reference now to FIG. 7A, the energy storage facility 110A may include a caldera 111; a reservoir 112 disposed at a relatively high location in the caldera 111; a conduit 114 that includes an exterior port 113 and a reservoir port 115, which conduit 114 provides fluid communication between a body of water and the reservoir 112; a floating powerhouse 116; one or more mooring cables 117A and mooring anchors 117B, which mooring anchors 117B may be embedded in the seafloor; and a turbine 119 disposed at least partially in the conduit 114.

The powerhouse 116 may include a pump that can pump water from the exterior port 113, up the conduit 114, and into the reservoir 112 via the reservoir port 115. To power this pump, the powerhouse 116 may receive electricity from the energy conduit 101. In some embodiments, the powerhouse 116 only receives energy from the energy conduit 101 when the energy production capacity of the network 100 exceeds global demand for energy, as is the case for FIG. 1D shown above. Water may be pumped substantially while the powerhouse 116 is receiving energy.

The powerhouse 116 may also include some or all of the elements of a base station 120, such as a network interface 128; energy management module 130; and energy prediction module 132, such that the powerhouse 116 may communicate with one or more base stations 120 or SCPS's 200 and receive information about energy demand and needs.

The reservoir 112 may store water a height that is higher than that of the exterior port 113. The reservoir port 115 accordingly may include a mechanical stopper or other mechanism to selectively store and release water from the reservoir 112. The reservoir port 115 may be opened to receive water pumped up the conduit 114. The reservoir port 115 may be closed to store the pumped water in the reservoir 112. The reservoir port 115 may be re-opened to release the stored pumped water from the reservoir 112 down the conduit 114 in order to turn the turbine 119 to generate electricity via a generator that is operatively connected to the turbine 119 and may be included in the powerhouse 116. The electricity generated by the generator in response to the movement of the turbine 119 may be provided to the energy network 100 via the energy conduit 101. In some embodiments, water is released from the reservoir 112 to drive the turbine 119 (and thus the generator) in response to spikes in demand for energy.

With specific reference to FIG. 7B, the energy storage facility 110B shown is generally structurally similar to the energy storage facility 110A shown in FIG. 7A. However, while the energy storage facility 110A includes a floating, moored powerhouse 116, the energy storage facility 110B includes a powerhouse 118 that is mounted on the seafloor 700. Like the powerhouse 116 in FIG. 7A, the powerhouse 118 in FIG. 7B may be in communication with the energy conduit 101, and may generally include some or all of the elements of a base station 120. The operation of the energy storage facility 110B is generally similar to that of the energy storage facility 110A as well. The powerhouse 118 of FIG. 7B may generally include some or all of the elements of the powerhouse 116 of FIG. 7A.

The primary difference between the energy storage facility 110A and the energy storage facility 110B is the mooring anchors 117B and mooring cables 117A to which the floating powerhouse 116 in FIG. 7A is tethered. In some embodiments, a mooring anchor 117B may include a winch such that the length of the mooring cable 117A may be adjusted (e.g., by reeling in or letting out the mooring cable 117A). One advantage of the approach in FIG. 7A is that seismic events such as earthquakes are relatively less likely to damage the floating powerhouse 116. The anchored powerhouse 118 of FIG. 7B may be appropriate for areas with relatively less seismic or volcanic activity, though either configuration may be used as desired. Further powerhouse configurations are possible and may be selected as desired, including a land-based power house.

Figure 8:
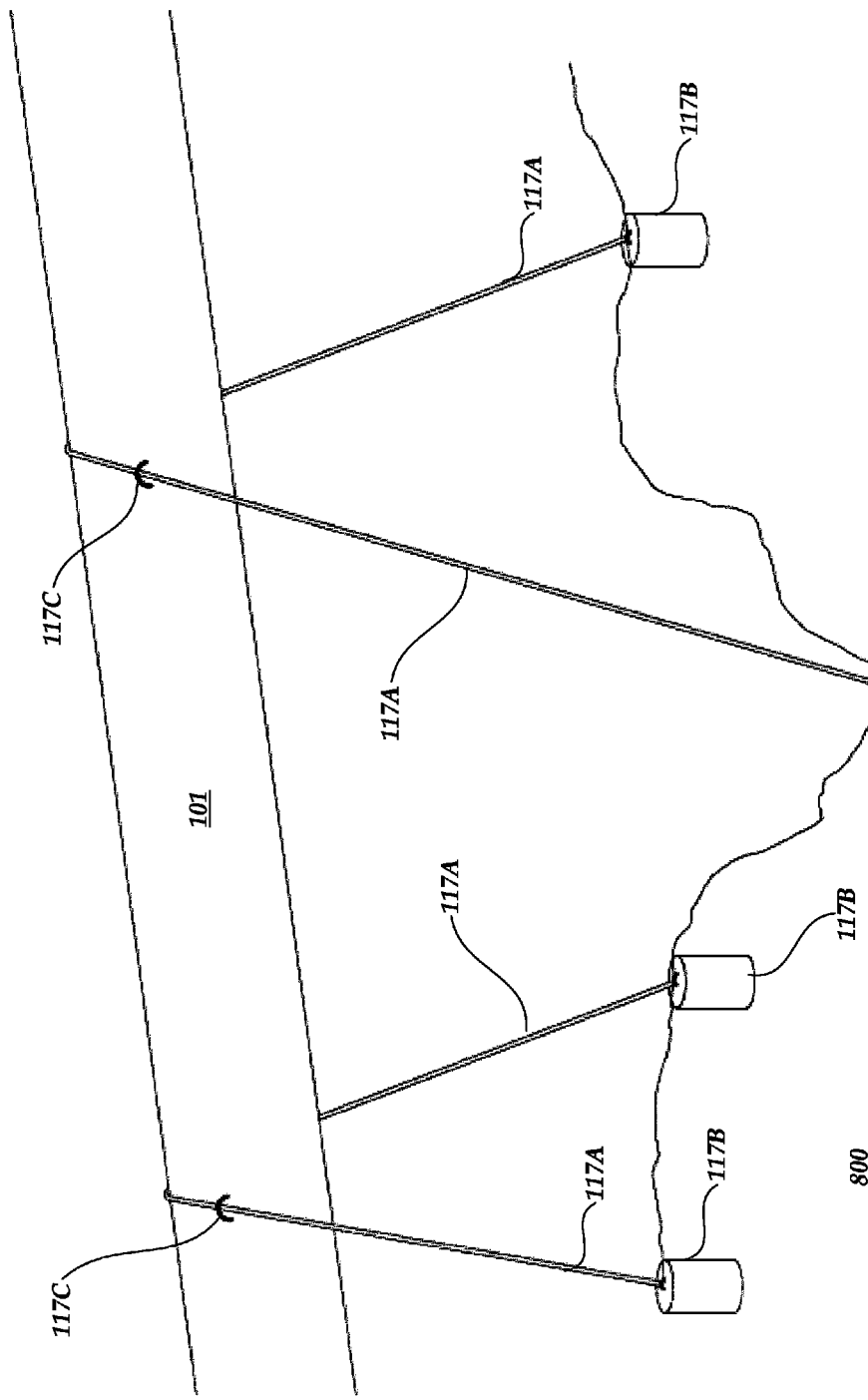
FIG. 8 is a schematic diagram depicting an illustrative energy conduit moored to a seafloor.

Turning now to FIG. 8, a submerged portion of an energy conduit 101 is shown. The energy conduit 101 may include one or more notches 117C on its exterior, which notches 117C may permit one or more mooring cables 117A to pass therethrough. The mooring cables 117A may be anchored to the seafloor 800 by one or more mooring anchors 117B embedded in the seafloor. In some embodiments, a mooring anchor 117B may include a winch such that the length of the mooring cable 117A may be adjusted (e.g., by reeling in or letting out the mooring cable 117A). Preferably, the energy conduit 101 is buoyant in the water in which it is submerged, such that the mooring cables 117A constrain the movement of the energy conduit 101 while still permitting the energy conduit to float over a limited vertical range. Thus, adjusting the length of the mooring cable 117A may adjust the depth at which the energy conduit 101 is submerged. Advantageously, this arrangement reduces the potential damage to an energy conduit 101 due to earthquakes or other tectonic events. The arrangement further allows portions of the energy conduit 101 to be "surfaced" by releasing tension in the mooring cable 117A.

Figure 9:
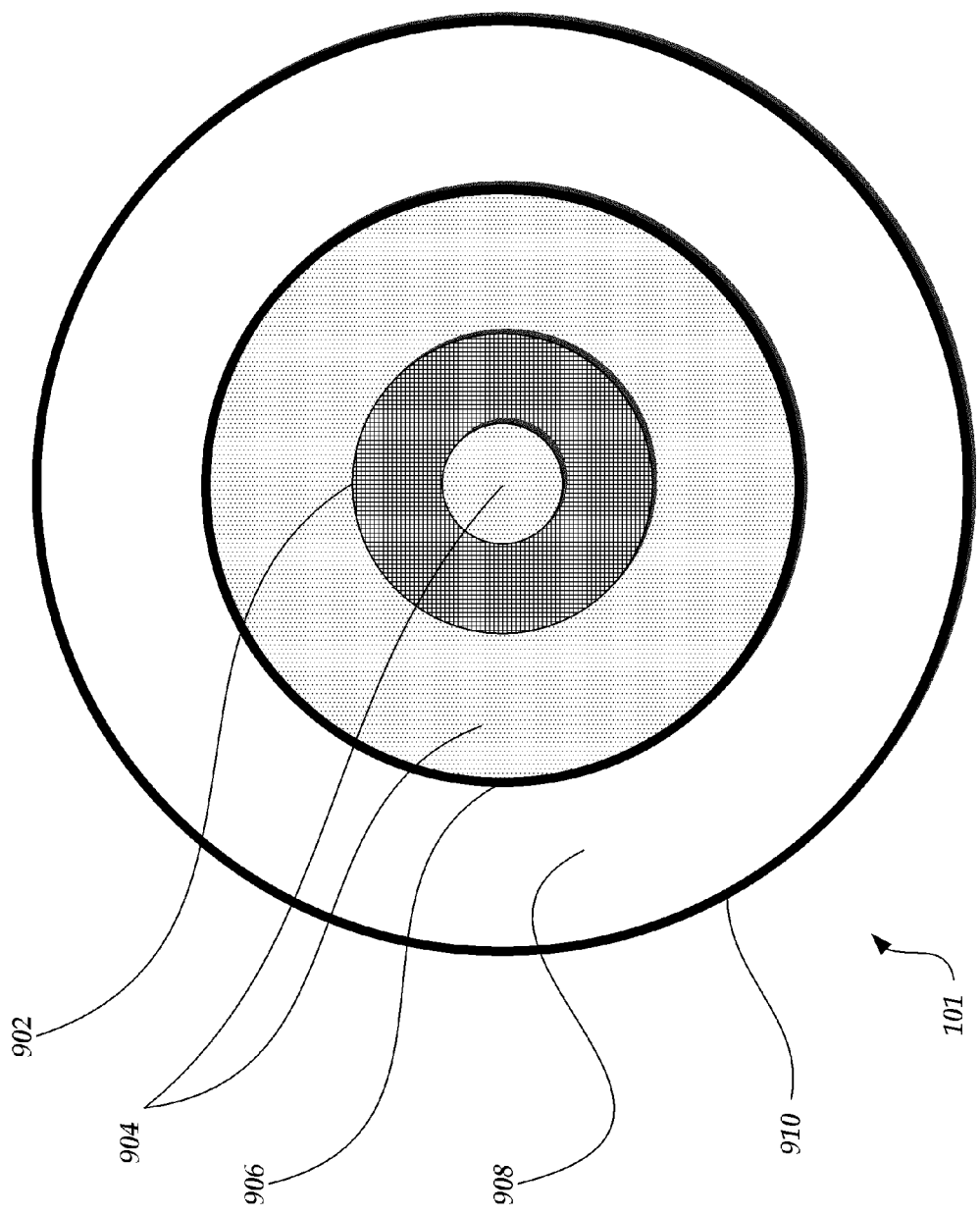
FIG. 9 is a cross-sectional diagram of the illustrative energy conduit shown in FIG. 8.

With specific reference now to FIG. 9, a cross-section of the energy conduit 101 shown in FIG. 8 is depicted. The energy conduit 101 may include a wire 902. In some embodiments, the wire 902 is composed of a high-temperature superconductor (HTS) material that can be cooled by liquid nitrogen (whose boiling point is 77 K) to a superconducting state. The HTS can be, for example, YBCO (yttrium-barium-copper-oxide, which becomes superconductive at a temperature at or below 90 K); BSCCO (bismuth-strontium-calcium-copper-oxide, which becomes superconductive at a temperature at or below 110 K); or any other HTS. Other superconducting materials can be used as well, including iron-based or niobium-based superconducting materials, for which liquid hydrogen or liquid helium may be used as a coolant. The wire 902 may carry electricity from one base station 120 to another base station 120 over long distances with a minimum of losses due to electrical resistance. In some embodiments, the electricity is carried as high voltage direct current.

The wire 902 may be surrounded by coolant 904. The coolant 904 may be selected based on the material used to form the wire 902. Preferably, the coolant has a boiling point lower than the temperature at which the material of the wire 902 becomes superconductive. For example, if the wire 902 is composed of YBCO or BSCCO, liquid nitrogen (which boils at 77 K), liquid hydrogen (which boils at 20 K), or liquid helium (which boils at 4.2 K) may be used as the coolant 904. If the wire 902 is composed of an iron-based superconductor, liquid hydrogen or liquid helium may be used as the coolant 904. If the wire 902 is composed of a niobium-based superconductor, liquid helium may be used as the coolant 904.

The wire 902 and coolant 904 may be housed in an inner shell 906. Preferably, the inner shell is composed of a gasimpermeable and liquid-impermeable material whose structural integrity will not be compromised by the low temperature of the coolant 904 (e.g., a material with a low coefficient of thermal expansion). For example, the inner shell 906 may be composed of stainless steel, borosilicate glass, or any other suitable material as described above.

The outer shell 910 forms the outer surface of the energy conduit 101. The selection of the material for the outer shell 910 may vary based on the deployment of the energy conduit 101. For example, an energy conduit 101 that passes underwater (whether freshwater or saltwater) may have an outer shell 910 composed of a material that resists corrosion by freshwater or saltwater, such as concrete, stainless steel, aluminum, or titanium. The outer shell 910 may also be covered in a corrosion-resistant material (e.g., by passivation, painting, applying a hydrophobic polymer coating, etc.).

An insulator 908 may be disposed between the inner shell 906 and the outer shell 910. Preferably, the insulator 908 inhibits heat transfer to the wire 902 from the environment (e.g., from the environment, to the outer shell 910, to the inner shell 906, to the coolant 904 and wire 902) so as to keep the wire cool enough to remain in a superconducting state. In some embodiments, the space between the inner shell 906 and the outer shell 910 is hermetically sealed, and thus the insulator 908 may simply be a vacuum or near-vacuum, which advantageously provides significant thermal insulation. In other embodiments, the insulator 908 may be a physical material with a relatively low coefficient of thermal expansion and relatively low thermal conductivity, such as perlite, glass fiber, silica aerogel, or composites thereof.

Still other configurations for an energy conduit 101 are possible. Among other acceptable examples, AMPERIUM® HTS wire (whether laminated with brass, copper, or stainless steel) manufactured by American Superconductor (AMSC) of Devens, Mass., could be included in an energy conduit 101. Further, while the cross-section shown in FIG. 9 depicts a concentric arrangement of the constituents of the superconducting energy conduit 101, it will be recognized that other arrangements are possible, including non-concentric arrangements, or arrangements that include multiple superconducting wires 902. Likewise, the design of each energy conduit 101 need not be identical for each energy conduit 101 included in the energy network.

Additionally, it should be noted that the energy conduit 101 need not have a uniform cross-sectional area. The energy conduit 101 need not have a circular cross-sectional area either. Rather, the energy conduit 101 may have one or more portions with different cross-sectional areas. As discussed above, an SCPS 200 may be placed in the path of an energy conduit 101. The cross-sectional area of a portion of the energy conduit 101 may be increased for a portion of the energy conduit 101 to accommodate an SCPS 200 therein (e.g., by providing an outer shell 910 that has a larger cross-sectional area). Alternately, an SCPS 200 may house a portion of the energy conduit 101 that passes through the SCPS 200. Still further arrangements for the energy conduit 101 with respect to an SCPS 200 are possible.

Figure 10:
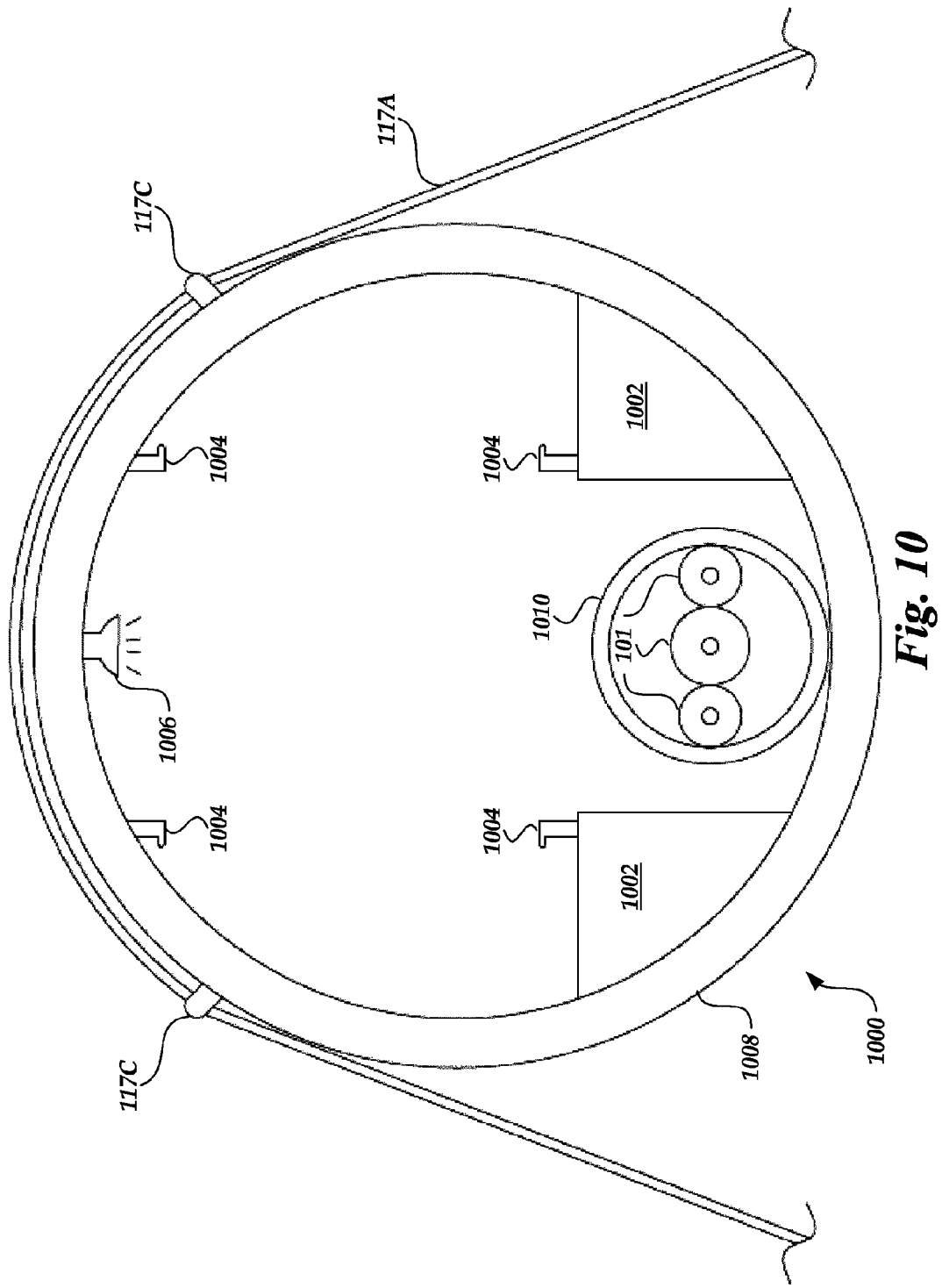
FIG. 10 is a cross-sectional diagram of a transportation conduit in which an energy conduit may be included.

Turning now to FIG. 10, a cross section of a tunnel 1000 in which one or more energy conduits 101 are included is shown. In some embodiments, the tunnel 1000 is placed underwater, though some or all of the tunnel 1000 may travel over land instead. Such a tunnel 1000 may include supports 1002, rails 1004, a lighting fixture 1006, an outer shell 1008, and an energy conduit body 1010 that contains one or more energy conduits 101. The tunnel 1000 may be moored to a seafloor by mooring cables 117A passing through notches 117C on the tunnel shell 1008, substantially as discussed above with respect to FIG. 8. In some embodiments, the tunnel 1000 is substantially circular in cross-section, with a diameter of approximately eight feet (or approximately 2.44 meters).

The supports 1002 may include any solid structure capable of supporting the rails 1004. The supports 1002 may further serve as ballast for portions of a tunnel 1000 that are placed underwater. The rails 1004 may be used to facilitate transportation through the tunnel 1000. For example, a service vehicle configured to travel along the rails 1004 (e.g., a train) may be provided with the tunnel 1000. The service vehicle may be used to transport materials or humans along the tunnel 1000, and may draw power from the energy conduits 101 housed by energy conduit body 1010. In one particular application, the service vehicle may transport one or more maintenance workers, who may perform repairs in the tunnel 1000 by the light of the lighting fixture 1006 while standing on the supports 1002.

The tunnel shell 1008 may provide a housing for the components of the tunnel 1000. The tunnel shell 1008 may generally include any of the materials included in the outer shell 910 of the energy conduit 101. The material chosen for the tunnel shell 1008 may vary based on the location of the tunnel 1000. For example, for underwater applications, the tunnel shell 1008 may include pre-stressed concrete reinforced with plastic and steel such that it is capable of withstanding water pressure at depths of six hundred feet, one thousand feet, or any other depth at which the tunnel 1000 may be situated. The tunnel shell 1008 may further be provided with an outer waterproof coating to prevent corrosion to metals included in the tunnel shell 1008. The coating may include paint, polymer coatings, or other corrosion-resistant materials. The tunnel shell 1008 may additionally include one or more docking stations, hatches, and/or airlocks to facilitate coupling to an underwater vehicle that may travel outside the tunnel shell 1008, such as a submarine. The tunnel shell 1008 may further be provided with one or more notches 117C as discussed above.

The energy conduit body 1010 may house one or more energy conduits 101. As discussed above, one or more SCPS's 200 may be included in the path of an energy conduit 101, and may be spaced approximately ten kilometers apart. Accordingly, the energy conduit body 1010 may also house one or more SCPS's. The cross-sectional area of the energy conduit body 1010 may be varied across one or more portions so that the SCPS 200 may be placed inside the energy conduit body 1010. For example, the cross-sectional area of the energy conduit body 1010 may be relatively large in some portions (e.g., to accommodate the size of an SCPS 200), while the cross-sectional area of the energy conduit body 1010 may be relatively smaller in other portions (e.g., to accommodate for only the size of one or more energy conduits 101).

Still other configurations for the tunnel 1000 are possible. An SCPS 200 need not be included within an energy conduit body 1010. Thus, the cross-sectional area of a portion of the tunnel shell 1008 may be varied to accommodate an SCPS 200 occupying the tunnel 1000, without necessarily varying the area of the energy conduit body 1010. One or more additional tunnels running in parallel with the tunnel 1000 may also be used to house an SCPS 200.

In some embodiments, the tunnel 1000 is evacuated of air such that a substantial vacuum exists inside at least part of the tunnel 1000. These embodiments advantageously minimize air resistance within the tunnel 1000, thereby making transport via the rails 1004 more efficient. Additionally, a magnetic levitating train may be used to provide transport via the rails 1004 as well. Energy drawn from an energy conduit 101 may be used to power the magnets that drive the magnetic levitating train, as known in the art.

Figure 11:
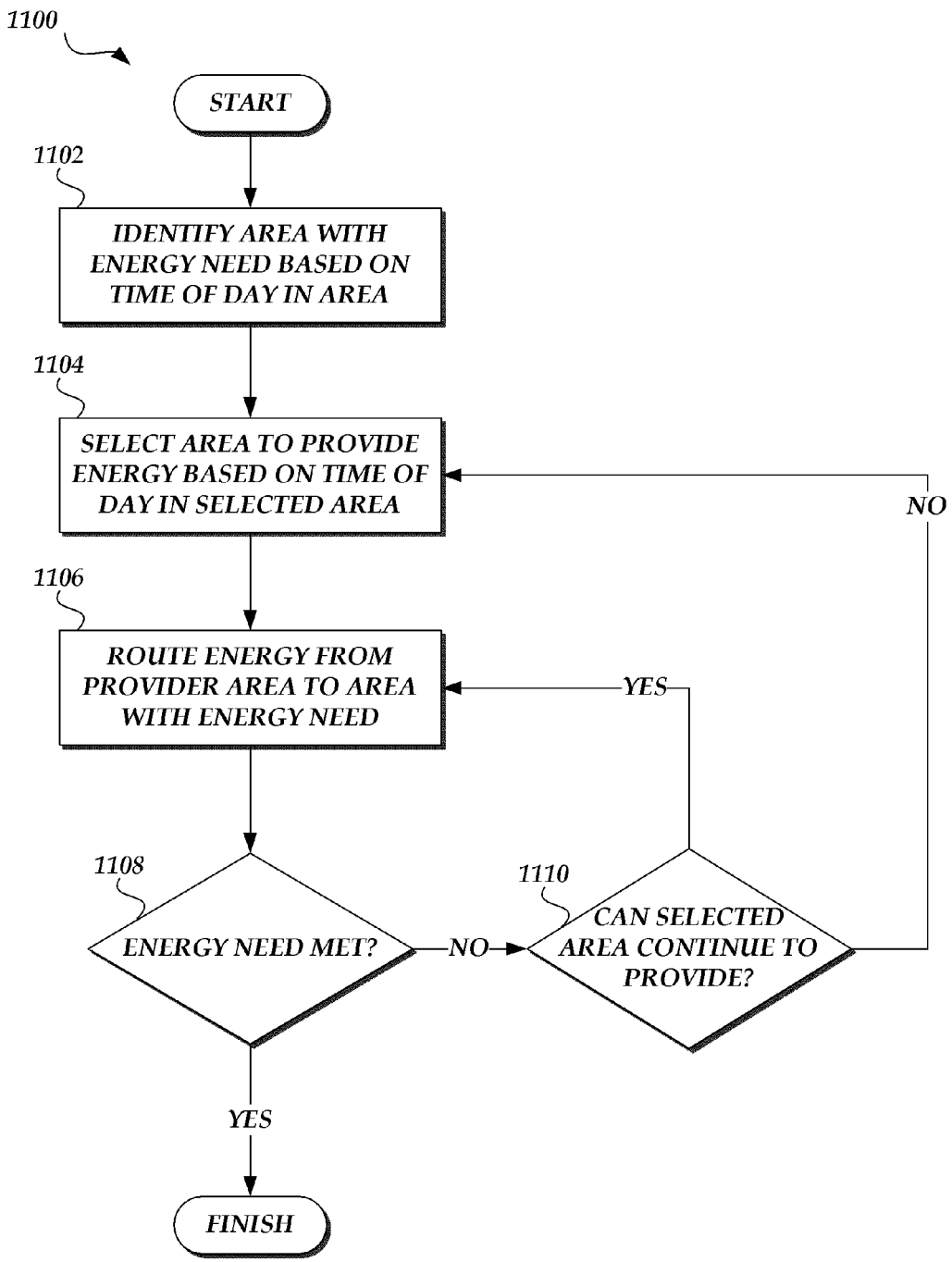
FIG. 11 is a flow diagram of an illustrative energy management routine.

With reference now to FIG. 11, the network of energy conduits may be managed according to the illustrative routine 1100 that illustrates the operation of the superconducting energy management system, as shown in FIG. 6. This illustrative routine 1100 may be implemented by an energy management module 130 of a base station 120. In some embodiments, the illustrative routine 1100 is implemented in real time or in near-real time to react to needs for energy. Accordingly, many base stations 120 may concurrently individually execute the illustrative routine 1100. Additionally, each base station 120 may implement the illustrative routine 1100 hundreds, thousands, or millions of times per second.

In block 1102, an area that exhibits a need for energy may be identified. In some embodiments, the area that exhibits an energy need is identified if that area experiencing peak hours during the day; that is, a time of day at which energy consumption is relatively high in the area (e.g., between 10 am and 4 pm local time, a period that overlaps with typical business hours), as discussed above with respect to FIG. 1A, FIG. 1B, and FIG. 1C. The area exhibiting the energy need may also be experiencing a peak season, or a time of year at which energy consumption is relatively high. Other indications of high or unmet energy demand or an energy shortage may also be used to identify an area with an energy need. For example, an energy source 104 associated with the area may have failed; for example, there may have been a power plant failure in the area of need. There may also be conditions that are unfavorable to renewable energy in the area of need (e.g., it may be a cloudy day for an area that uses solar energy sources, or an area uses hydroelectric energy may be experiencing a drought). An area may also be deemed to exhibit a need for energy if energy prices are relatively high in that area.

In other embodiments, area of need may be identified based on a request for energy received from a base station 120 associated with the area of need. In other embodiments, the base station 120 implementing the illustrative routine 1100 may identify its own area as an area of need. In still other embodiments, a request need not be made directly by a "needy" base station 120 for the area to exhibit a need for energy. For example, the a base station 120 may monitor one or more areas (e.g., by obtaining information gathered by one or more base stations 120 associated with each area) in order to identify an area in which power plants or other energy sources in its area are already running at or near full capacity.

Turning now to block 1104, an area that exhibits an ability to provide energy may be selected to provide energy to the area that exhibits the need for energy. In some embodiments, this area may be selected substantially immediately after a request for energy is received, or substantially immediately after an area of need is identified (e.g., within milliseconds, tenths of seconds, or seconds, depending on the processing power of the one or more computing devices implementing the routine 1100). Once a provider area is selected, an energy source of the provider area may have its energy routed through the local grid 102, converted into direct current at the base station 120, and routed via the superconducting energy conduit 101 to the area of need. In some embodiments, the provider area is selected based at least in part on a time of day in the provider area. For example, an area may be selected as a provider area if it is nighttime in the area (e.g., between 10 pm and 4 am local time), which may be associated with a relatively low demand on the energy sources 104 in the area, as discussed above with respect to FIG. 1A, FIG. 1B, and FIG. 1C.

In other embodiments, the selected area is an area from which an offer to provide energy has been transmitted from a base station 120. The base station 120 may also select its own area as a provider area. In still other embodiments, an offer area need not be made explicitly; rather, a base station 120 implementing the illustrative routine 1100 may identify a provider area directly by obtaining information about the area with which another base station is associated, either from the base station 120 in that area or from external information resources. For instance, the provider area may have idle energy sources or energy sources that are operating at less than full capacity. The provider area may also lie in an area that is at an off-peak season; that is, a time of year at which energy consumption is relatively low. There may also be few or no consumers of energy in that particular area. For instance, the provider area may include a wind energy source 104, but may be in a remote location that includes relatively few consumers.

Further criteria for selecting a provider area may be used. For instance, as discussed above, energy sources may be ranked according to, for example, how much pollution they produce. It may be desirable to prioritize using electricity from clean energy sources, or renewable energy resources, sometimes referred to herein as "green" energy sources. Accordingly, the provider area may be an area that includes green energy sources, such as wind power, solar power, geothermal power, hydroelectric power, or other types of clean energy. Still other criteria may be provided for selecting a provider area in block 1104. For instance, geography may be considered. It may be preferable to select areas that are relatively far away or relatively near the area with the energy need, depending on the implementation of the superconducting energy management system.

A provider area may also be selected according to a price of energy in one or more potential provider areas so as to facilitate the arbitrage of energy between the provider area and the need area. A provider area may also be selected according to contractual obligations that the provider area may have to the area of need (or vice versa). Still other criteria for selecting a provider area may be used.

Turning now to block 1106, energy may be routed from the provider area to the area with the energy need. Specifically, the base station 120 in the need area may transmit a signal to the base station 120 at the provider area to direct the base station 120 at the provider area to draw power from an energy source 104 in the provider area, and route that energy over the superconducting energy network 100 to the need area. Electrical switches may be provided with the superconducting energy network 100 to direct the energy from the provider area to the area with the energy need. For example, switches can be opened along each energy conduit 101 (e.g., at each SCPS 200 along the energy conduit 101) over which electrical energy is to be routed, and closed to restrict the flow of electrical energy into other energy conduits 101 (e.g., at each SCPS 200 along one or more other energy conduits 101). Systems and methods for performing such switching are well-known in the art and need not be further discussed herein.

Turning now to block 1108, the superconducting energy management system may determine whether the energy need of the area identified in block 1102 has been met or satisfied. Whether the energy need for the area identified in block 1102 has been met or satisfied may be determined in a number of ways. In some embodiments, the energy need may be met if the base station 120 in the area of need indicates that the amount of energy being provided to the area is sufficient to meet the energy needs of that area. The base station 120 in the area of need may then transmit a signal to the controller computing device 300 to indicate that the energy needs have been met. Additionally, energy needs may be deemed to have been constructively met for an area if peak hours for the area have ended; if the peak season for the area has ended; if the conditions unfavorable to renewable energy generation at the area of need have ended; or if the failure of a power plant or other energy source at the area of need has been corrected. On the other hand, if the base station 120 transmits another request for energy, it may indicate that the energy need has not been met or satisfied.

If the energy need of the area of need identified in block 1102 has been met, the energy management routine 1100 may finish. However, if the energy need for the area of need identified in block 1102 has not been met, the superconducting energy management system may determine if the area selected in block 1104 can continue to provide energy in block 1110. For example, the provider area selected in block 1104 may be deemed to be able to continue to provide energy if the provider area does not meet any conditions that indicate it is an area of need. For instance, the selected provider area may continue to be able to provide if its energy sources are not operating at full capacity or if it remains the off-peak hours or the off-peak season at the provider area; or if conditions at the provider area remain favorable to the generation of renewable energy to be provided to the area with the energy need identified in block 1102. In another embodiment, the energy network management module 130 of the base station 120 may generate a subsequent request for energy (either for itself or on behalf of a base station 120 in the need area) and cause it to be transmitted to the base station 120 associated with the provider area. If the base station 120 of the provider area returns an offer to provide energy, it may be deemed to be able to continue to provide energy. If the selected provider area can continue to provide, energy may continue to be routed at block 1106 from the provider area to the area with the energy need. If not, a new provider area may be selected to provide energy to the area of need in block 1104.

It will be recognized that many variations on the illustrative routine 1100 are possible. For example, multiple areas may be selected to provide energy to a single area, or a single provider area may be selected to provide energy to multiple areas. Additionally, the routine may include heuristics or other decision criteria for prioritizing areas of need or for prioritizing the selection of provider areas. Moreover, areas of need and provider areas may be proactively identified based on predictions or forecasts associated with each area. For example, the superconducting energy management system may predict that demand will be relatively high during peak hours of a summer day in a particular area, and proactively identify that area as an area of need. Further, if one or more provider areas have been identified in block 1104, but no area of need has been identified in block 1102, electricity may be routed from the identified provider areas and routed over the network of energy conduits 101 to store the electricity with an energy storage facility, as discussed now with respect to FIG. 12.

Figure 12:
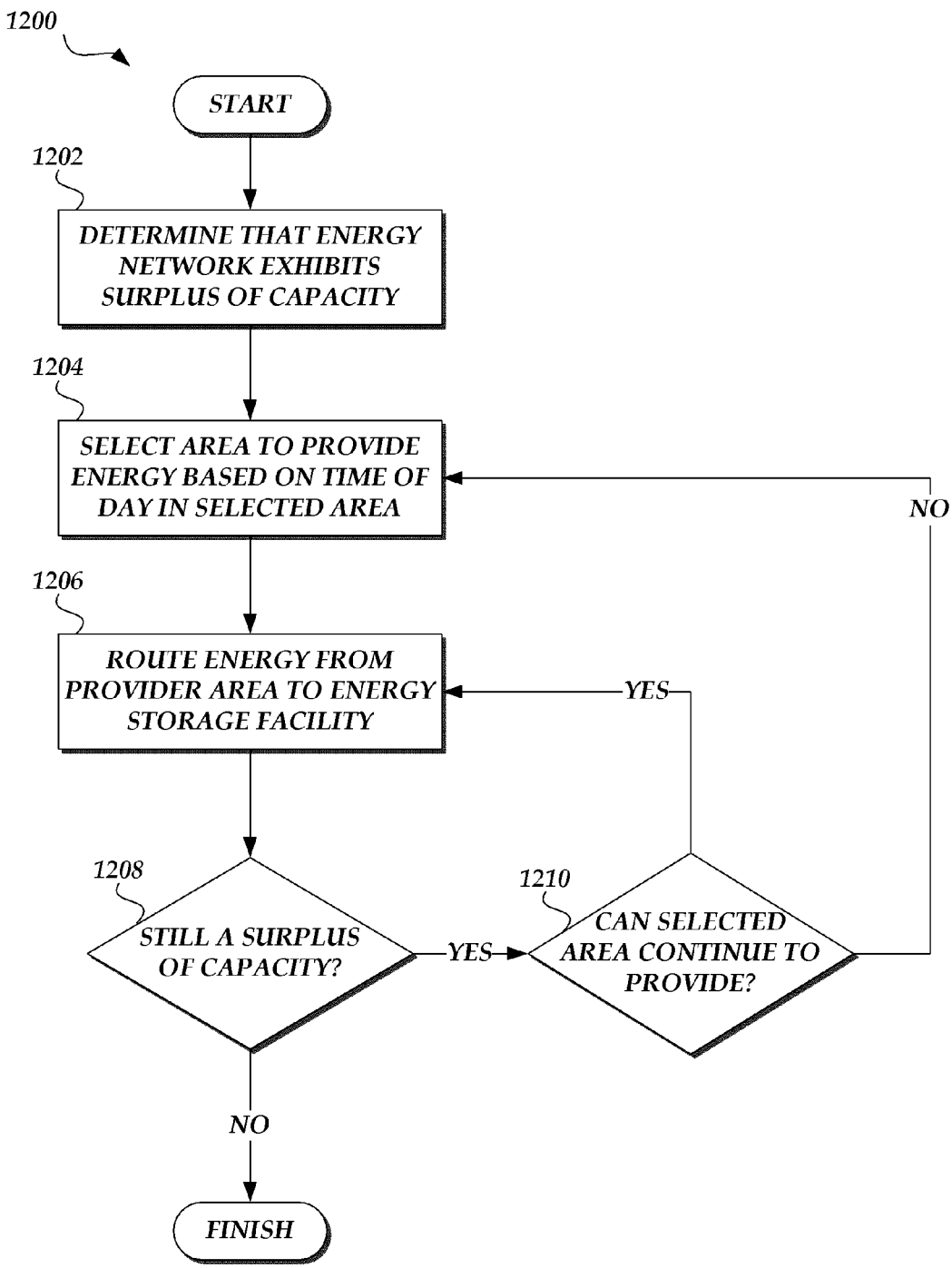
FIG. 12 is a flow diagram of an illustrative energy management routine.

Turning now to FIG. 12, an illustrative routine 1200 is shown for routing energy to an energy storage facility 110 for storage (e.g., as gravitational potential energy in a caldera energy storage facility 110 as shown in FIG. 7A and FIG. 7B, as circulated electrical energy in a superconducting magnetic energy storage facility 110, etc.). The illustrative routine 1200 may be implemented by one or more energy management modules 130 of the one or more base stations 120. In some embodiments, the illustrative routine 1200 is implemented in real time or in near-real time to react to needs for energy. Accordingly, many base stations 120 may concurrently individually execute the illustrative routine 1200. Additionally, each base station 120 may implement the illustrative routine 1200 hundreds, thousands, or millions of times per second.

The illustrative routine begins at block 1202, in which an energy management module 130 determines that the energy network 100 as a whole exhibits a surplus of generation capacity across the various areas covered by the energy network 100. In some embodiments, the energy management modules 130 of one or more base stations 120 of the energy network 100 may communicate the generating capacity of each area (e.g., as may be determined by obtaining information about one or more energy sources 104 in each area) and the demand for each area at a given time (e.g., as may be determined by obtaining information about demand on a local grid 102 in each area), which an energy management module 130 may aggregate to determine whether the energy network exhibits a surplus of capacity.

In other embodiments, as discussed above with respect to FIG. 1D, the energy network 100 may experience a surplus of generation capacity relative to demand on the energy network when it is daylight over the sparsely populated Pacific, but nighttime across more populated regions such as Europe, Asia, and Africa. Accordingly, the energy management module 130 may determine that the energy network 100 experiences a surplus of generation capacity relative to demand when it is between 10 am and 4 pm local time in the Pacific, and between 10 pm and 4 am local time in Europe, Asia, or Africa.

At block 1204, the illustrative routine 1200 may select a provider area to provide energy to be stored with an energy storage facility 110. The provider area may be selected substantially as discussed above with respect to block 1104 of FIG. 11. In some embodiments, the provider area is selected based at least in part on a time of day in the provider area. For example, an area in which it is between 10 pm and 4 am local time may be selected as a provider area. In other embodiments, the provider area may be selected based at least in part on a price of energy in one or more areas; on an availability of renewable energy in one or more areas; or on contractual obligations that the provider area may have to the need area (or vice versa).

At block 1206, energy from the provider area may be routed to an energy storage facility 110. As discussed above, electrical switches may be provided with the superconducting energy network 100 to direct the energy from the provider area to the energy storage facility 110. For example, the provider area's base station 120 may direct that switches be opened along each energy conduit 101 (e.g., at each SCPS 200 along the energy conduit 101) along the path from the provider area's base station 120 to the energy storage facility 110. The provider area's base station may also direct that switches be closed elsewhere in the energy network 100 to restrict the flow of electrical energy into other energy conduits 101 (e.g., at each SCPS 200 along one or more other energy conduits 101).

At block 1208, the illustrative routine 1200 may determine whether a surplus of generation capacity still exists with respect to demand for energy on the energy network 1208. In some embodiments, this determination is made based at least in part on a time of day of the Earth. For example, if the earth's rotational position with respect to the sun 2 is substantially similar to the position 1D shown in FIG. 1D (e.g., if it is still substantially daytime over the Pacific and nighttime in Europe, Asia, and Africa), a surplus of capacity may still exist in the network 100. On the other hand, if the earth's rotational position with respect to the sun 2 is substantially similar to the positions 1A, 1B, or 1C (as shown in FIG. 1A, FIG. 1B, and FIG. 1C, respectively), a surplus of capacity may be determined not to exist in the network. In other embodiments, this determination may be made by collecting information about demand and generation capacity from one or more base stations 120 in one or more areas, aggregating the demand for energy and generation capacity across the network, and comparing the aggregate demand to the aggregate generation capacity.

If the illustrative routine 1200 determines at block 1208 that the surplus of generation capacity no longer exists, then the illustrative routine 1200 may conclude and energy may cease to be routed to the energy storage facility 110. On the other hand, if the illustrative routine 1200 determines at block 1208 that the surplus of capacity still exists, then the illustrative routine 1200 may at block 1210 determine if the area selected at block 1204 can continue to provide energy. As discussed above with respect to block 1110 of FIG. 11, the provider area selected in block 1204 may be deemed to be able to continue to provide energy if the provider area does not meet any conditions that indicate it is an area of need. For instance, the selected provider area may continue to be able to provide if its energy sources are not operating at full capacity or if it remains the off-peak hours or the off-peak season at the provider area; or if conditions at the provider area remain favorable to the generation of renewable energy to be provided to the energy storage facility 110. If the selected provider area can continue to provide, energy may continue to be routed at block 1206 from the provider area to the energy storage facility 110. If not, a new provider area may be selected to provide energy to the energy storage facility 110 at block 1204.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor can also include primarily analog components. For example, any of the signal processing algorithms described herein can be implemented in analog circuitry. A computing environment can include any type of computer system, including, but not limited to, a computer system based on a microprocessor, a mainframe computer, a digital signal processor, a portable computing device, a personal organizer, a device controller, a computational engine within an appliance, and a programmable logic controller, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for global energy management, the system comprising:
- a first base station located on a first continent, wherein a first energy demand curve is associated with energy used from the first base station;
- a second base station located on a second continent, wherein a second energy demand curve is associated with energy used from the second base station, and wherein the first and second energy demand curves out of phase with respect to each other by at least eight hours;
- an energy network comprising a plurality of superconductive energy conduits and sensing cooling pumping stations coupled to said superconductive energy conduits that provide electrical connectivity between the first base station and the second base station,
- wherein the sensing cooling pumping stations are configured to cool the superconductive energy conduits to a temperature that allows superconductive transmission of electrical energy through said superconductive energy conduits, and
- wherein a plurality of the sensing cooling pumping stations are submerged beneath an ocean surface;
- an energy source configured to generate electricity, wherein the energy source is located on the first continent, and wherein the energy source is electrically connected to the first base station; and
- a local grid located on the second continent, wherein the local grid is electrically connected to the second base station;
- wherein at least one of the first base station and the second base station are configured to direct the energy source to generate electricity;
- wherein the first base station is configured to provide the electricity generated by the energy source to the second base station via one or more energy conduits of the energy network;
- wherein the second base station is configured to provide the electricity received via the energy network to the local grid, and
- wherein the energy network is configured to transfer electrical energy from the first base station to the second base station at a time that is near the peak of the second energy demand curve and simultaneously near a trough of the first energy demand curve, such that the generating capacity of the first and second continents is significantly reduced.

2. The system of claim 1, wherein at least one of the first base station and the second base station are configured to direct the energy source to generate electricity during a local time in a time zone in which the energy source is located.

3. The system of claim 2, wherein the local time in the time zone in which the energy source is located falls substantially between 6 pm local time and 6 am local time, or between 10 pm local time and 4 am local time.

4. The system of claim 1, wherein at least one of the first base station and the second base station are configured to direct the energy source to generate electricity during a local time in a time zone in which the local grid is located.

5. The system of claim 4, wherein the local time in the time zone in which the local grid is located falls substantially between 8 am local time and 4 pm local time.

6. The system of claim 1, wherein one or more of the plurality of energy conduits of the energy network form a circumpolar loop.

7. The system of claim 6, wherein the circumpolar loop is arranged about the geographic north pole.

8. The system of claim 1 further comprising an energy storage facility connected to the energy network by one or more energy conduits.

9. The system of claim 1, wherein at least one of the plurality of energy conduits of the energy network comprises a wire comprising a high-temperature superconductor.

10. A computer-implemented method of operating a system for global energy management, the computer-implemented method comprising:
- under control of one or more computing devices configured with specific computer-executable instructions,
  - determining that a plurality of grids within a system for global energy management collectively exhibits a generation capacity greater than a demand for electrical energy collectively exhibited by the plurality of grids,
  - wherein the system for global energy management comprises:
    - a first base station located on a first continent, wherein a first energy demand curve is associated with energy used from the first base station;
    - a second base station located on a second continent, wherein a second energy demand curve is associated with energy used from the second base station, and wherein the first and second energy demand curves out of phase with respect to each other by at least eight hours;
    - an energy network comprising a plurality of superconductive energy conduits and sensing cooling pumping stations coupled to said superconductive energy conduits that provide electrical connectivity between the first base station and the second base station,
    - wherein the sensing cooling pumping stations are configured to cool the superconductive energy conduits to a temperature that allows superconductive transmission of electrical energy through said superconductive energy conduits, and
    - wherein a plurality of the sensing cooling pumping stations are submerged beneath an ocean surface;
    - an energy source configured to generate electricity, wherein the energy source is located on the first continent, and wherein the energy source is electrically connected to the first base station; and
    - a local grid located on the second continent, wherein the local grid is electrically connected to the second base station,
    - wherein at least one of the first base station and the second base station are configured to direct the energy source to generate electricity,
    - wherein the first base station is configured to provide the electricity generated by the energy source to the second base station via one or more energy conduits of the energy network,
    - wherein the second base station is configured to provide the electricity received via the energy network to the local grid, and
    - wherein the energy network is configured to transfer electrical energy from the first base station to the second base station at a time that is near the peak of the second energy demand curve and simultaneously near a trough of the first energy demand curve, such that the generating capacity of the first and second continents is significantly reduced;

identifying a first grid of the plurality of grids, the first grid being located on the first continent and exhibiting a surplus of generation capacity relative to its peak capacity; and directing the first grid to increase its generation of electrical energy and to route the generated electrical energy in substantially real time to at least one energy storage facility via the one or more energy conduits.

11. The computer-implemented method of claim 10, wherein the at least one energy storage facility comprises a superconductive magnetic energy storage apparatus.

12. The computer-implemented method of claim 11, wherein the superconductive magnetic storage apparatus comprises one or more loops of superconducting wire.

13. The computer-implemented method of claim 10, wherein the energy storage facility comprises:
a caldera formed at the basin at the peak of a volcano, the caldera defining a first height, a second height, and a path between the first height and the second height, wherein the second height is higher than the first height, and wherein the caldera is in fluid communication with a lake, ocean, or sea of water at the first height;
a reservoir disposed at the second height of the caldera, the reservoir configured to store water and to selectively release the water down the path between the first height and the second height; and
a pump positioned within the lake, ocean, or sea of water, offshore from the volcano and configured to use the electrical energy routed to the energy storage facility to pump water from the lake, ocean, or sea of water at the first height to the reservoir at the second height.

14. The computer-implemented method of claim 13, wherein the energy storage facility further comprises a turbine disposed in the path between the first height and the second height, wherein the turbine is configured to be turned by water selectively released down the path by the reservoir.

15. The computer-implemented method of claim 14, wherein the energy storage facility further comprises a generator operatively connected to the turbine, wherein the generator is configured to generate electrical energy responsive to the turbine being turned.

16. The computer-implemented method of claim 10, wherein determining that the plurality of grids collectively exhibits a generation capacity greater than the demand for electrical energy collectively exhibited by the plurality of grids comprises predicting a time at which the plurality of grids collectively exhibits a generation capacity greater than the demand for electrical energy collectively exhibited by the plurality of grids.

17. The computer-implemented method of claim 16, wherein the predicted time substantially corresponds to a time between 10 am and 4 pm local time in at least one of Hawaii-Aleutian Standard Time, Samoa Standard Time, and Chamorro Standard Time.

18. The computer-implemented method of claim 16, wherein the predicted time is based at least in part on one or more time zones in which one or more of the plurality of grids lie.

19. The computer-implemented method of claim 10 further comprising:
determining that the plurality of grids no longer collectively exhibits a generation capacity less than the demand for electrical energy collectively exhibited by the plurality of grids;
identifying a second grid of the plurality of grids, the second grid exhibiting a need for electrical energy; and
responsive to identifying the second grid of the plurality of grids, directing the energy storage facility to route the electrical energy stored by the energy storage facility to the second grid via the one or more energy conduits.

20. The system for global energy management of claim 1, wherein at least one sensing cooling pumping station comprises:
a housing configured to accommodate an energy conduit passing therethrough;
a coolant tank disposed inside the housing, the coolant tank configured to store a coolant;
a cryogenic system disposed inside the housing and connected to the coolant tank, wherein the cryogenic system is configured to pump the coolant into the energy conduit;
an energy sensor disposed inside the housing, wherein the energy sensor is configured to detect electricity flowing through the energy conduit;
a routing switch disposed inside the housing, wherein the routing switch is configured to selectively permit or prevent the flow of electricity through the energy conduit; and
a communication system disposed inside the housing, wherein the communication system is configured to:
receive a direction from a base station to permit or prevent the flow of electricity through the portion of the energy conduit passing through the housing; and
responsive to receiving the direction, cause the routing switch to permit or prevent the flow of electricity through the portion of the energy conduit passing through the housing.

* * * * *